US011597022B2

(12) United States Patent
Kruepke et al.

(10) Patent No.: US 11,597,022 B2
(45) Date of Patent: Mar. 7, 2023

(54) ALGORITHMS AND METHODS FOR CONTROLLING THREADING OF PIPE

(71) Applicant: Emerson Professional Tools, LLC., Elyria, OH (US)

(72) Inventors: Scott Kruepke, Valley City, OH (US); Seth B. Bullock, Cleveland, OH (US); Glen R. Chartier, Avon Lake, OH (US); Naga Penmetsa, Westlake, OH (US); Dominic Amantea, Brookpark, OH (US); Curtis Hendrix, Elyria, OH (US); Nicholas Amaral, Medina, OH (US); Dan-Radu Bozdog, Salaj (RO)

(73) Assignee: Emerson Professional Tools, LLC, Elyria, OH (US)

( * ) Notice: Subject to any disclaimer, the term of this patent is extended or adjusted under 35 U.S.C. 154(b) by 0 days.

(21) Appl. No.: 17/520,019

(22) Filed: Nov. 5, 2021

(65) Prior Publication Data

US 2022/0134460 A1    May 5, 2022

Related U.S. Application Data

(60) Provisional application No. 63/217,802, filed on Jul. 2, 2021, provisional application No. 63/109,906, filed on Nov. 5, 2020.

(51) Int. Cl.
*B23G 1/22* (2006.01)
*B23G 1/24* (2006.01)
*B23G 1/46* (2006.01)

(52) U.S. Cl.
CPC .............. *B23G 1/225* (2013.01); *B23G 1/24* (2013.01); *B23G 1/465* (2013.01); *B23G 2240/36* (2013.01); *B23G 2240/52* (2013.01)

(58) Field of Classification Search
CPC .......... B23G 1/225; B23G 1/24; B23G 1/465; B23G 2240/36; B23G 2240/52
See application file for complete search history.

(56) References Cited

U.S. PATENT DOCUMENTS

| | | | |
|---|---|---|---|
| 11,077,509 B2* | 8/2021 | VanDaalwyk | ............ B23G 1/24 |
| 11,344,961 B2* | 5/2022 | Ceroll | ........................ B25B 5/12 |
| 2012/0039679 A1 | 2/2012 | Kundracik et al. | |
| 2014/0037394 A1 | 2/2014 | Patil et al. | |
| 2014/0226154 A1 | 8/2014 | Sakai et al. | |
| 2019/0283157 A1 | 9/2019 | VanDaalwyk et al. | |
| 2019/0314946 A1* | 10/2019 | Dey, IV | ................. B23G 1/225 |
| 2019/0381648 A1* | 12/2019 | Wadeson | .............. B25B 21/002 |
| 2020/0189017 A1 | 6/2020 | Ceroll et al. | |

FOREIGN PATENT DOCUMENTS

| | | | | |
|---|---|---|---|---|
| CN | 109986148 A | * | 7/2019 | |
| EP | 1775049 A1 | * | 4/2007 | ............... B23G 1/18 |

OTHER PUBLICATIONS

International Search Report (ISR), Written Opinion dated Feb. 7, 2022; Application No. PCT/US21/58190; 17 pages.

* cited by examiner

*Primary Examiner* — Eric A. Gates
(74) *Attorney, Agent, or Firm* — Mark E. Bandy; Rankin Hill & Clark, LLP

(57) ABSTRACT

Various methods are described for forming threads in a workpiece, and particularly for controlling and/or monitoring threading of workpieces. Also described are tools and a system used in performing the methods.

9 Claims, 14 Drawing Sheets

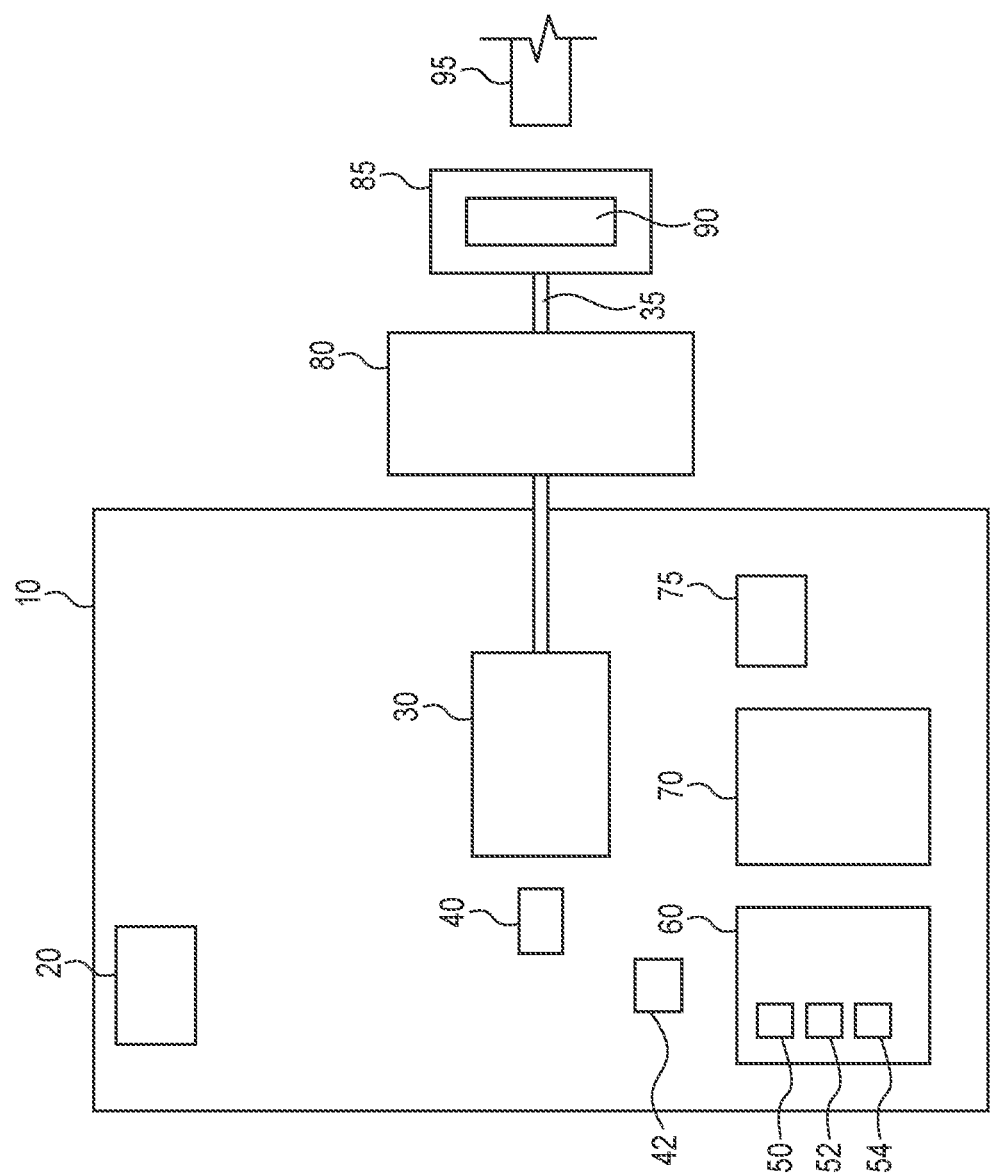

ALGORITHMS AND METHODS FOR CONTROLLING THREADING OF PIPE

CROSS REFERENCES TO RELATED APPLICATIONS

This application claims priority from U.S. provisional application Ser. No. 63/109,906 filed on Nov. 5, 2020; and U.S. provisional application Ser. No. 63/217,802 filed on Jul. 2, 2021.

FIELD

The present subject matter pertains to hand-held power drives and especially those designed for pipe threader use. The present subject matter is also particularly applicable to pipe threading operations performed using threading machines or similar devices having a component that is rotatable about an axis relative to a workpiece such as a length of pipe. The present subject matter is also particularly applicable to any process in which control or monitoring work of a tool is desired, and particularly for a known number of rotations relative to an end portion of a workpiece such as a length of pipe, or amount of time for a threading component of such a machine or device to reach such end portion, or where loss of control of a rotational tool is undesirable.

BACKGROUND

During conventional use of power drives, and specifically while operating a pipe threading tool (see, e.g., U.S. Pat. Nos. 6,502,041; 8,804,104; 9,267,900, and US Published Application 2020/0189017), a user must closely watch the end of a length of pipe or other workpiece as it is being threaded, to avoid problems arising when the pipe-threading operation is stopped too early or too late. When the end of the pipe aligns with an end of a fixed die, the thread is completed according to applicable industry standards, as desired, and operation of the tool can be stopped. However, it is often difficult for an operator to see the end of the length of pipe during the die head rotation of the thread-cutting component of the tool. Thus, uncertainty can result when the operator of the tool discontinues threading, unless monitored. Moreover, less skilled operators are often used to operate the tool. Such users often may not recognize thread completion and thus may not be able to adequately monitor.

Power drives, and especially hand-held power drives, are capable of exerting a significant amount of torque ordinarily required to thread pipe or drive other functions. Whether use of a support arm to counteract such torque is either mandated by industry or governmental standards, or merely recommended (depending on application), certain users choose not to use the support arm but, instead, manually achieve such required torque by manually holding the tool in-place. (See, e.g., US 2015/0086287.) If the tool slips from such users' grip, or the reaction force exceeds such users' physical capabilities, the tool may rotate relative to the workpiece uncontrollably. Similarly, poor attachment of the support arm can cause the support arm to slip and thus cause the tool to rotate relative to the pipe. In either of these scenarios, the torque of the tool can be transmitted to such users without warning.

Accordingly, in view of these and other concerns, a need exists for new methods for controlling threading of pipe or other workpieces.

SUMMARY

As will be realized, the subject matter described herein is capable of other and different embodiments and its several details are capable of modifications in various respects, all without departing from the claimed subject matter. Accordingly, the drawings and description are to be regarded as illustrative and not restrictive.

In one aspect, the present subject matter provides a method for forming threads in a workpiece using a tool including a tool head having at least one threading die, an electric motor rotatably powering the tool head, a sensor for measuring electrical current consumed by the motor, a controller for controlling operation of the motor, a counter of motor rotations, and memory provisions for saving motor-rotation counts. The method comprises rotating the tool head that includes at least one threading die, by use of the motor. The method also comprises measuring electrical current consumed by the motor, by use of the sensor. The method also comprises comparing the measured electrical current to a first threshold value, whereby if the first threshold value has not been met, the measuring and comparing operations are repeated. If the first threshold value has been met, the method comprises incrementing the counter of motor rotations to produce a cumulative motor rotation count. The method also comprises performing a second comparison of the cumulative motor rotation count to a second threshold value, whereby if the second threshold value has not been met, the incrementing and second comparing operations are repeated.

In another aspect, the present subject matter provides a method for forming threads in a workpiece using a tool including a tool head having at least one threading die, an electric motor rotatably powering the tool head, a sensor for measuring electrical current consumed by the motor, a controller for controlling operation of the motor, a counter of motor rotations, and memory provisions for saving motor-rotation counts. The method comprises rotating the tool head that includes at least one threading die, by use of the motor. The method also comprises measuring electrical current consumed by the motor, by use of the sensor. The method also comprises comparing the measured electrical current to a first threshold value, whereby if the first threshold value has not been met, the measuring and comparing operations are repeated. If the first threshold value has been met, the method comprises incrementing the counter of motor rotations to produce a cumulative motor rotation count. The method also comprises performing a second comparison of the cumulative motor rotation count to a second threshold value, whereby if the second threshold value has not been met, the incrementing and second comparing operations are repeated. If the second threshold value has been met, the method comprises reversing a direction of rotation of the tool head. The method also comprises performing another measurement of electrical current consumed by the motor, by use of the sensor. The method also comprises performing a third comparison of the measured electrical current after reversing the direction of rotation of the tool head to a no-load current value, whereby if the no-load current value has not been met, the performing another measurement of electrical current consumed and third comparing operations are repeated. If the no-load current value has been met, the method comprises discontinuing tool operation or braking tool rotation.

In still another aspect, the present subject matter provides a method for forming threads in a workpiece using a tool including a tool head having at least one threading die, an electric motor rotatably powering the tool head, a sensor for measuring angular velocity of the tool head, an angular velocity counter, a timer for measuring a time step, a controller for controlling operation of the motor, and memory provisions for saving time measurements. The method comprises setting the angular counter to zero. The method also comprises rotating the tool head that includes the at least one threading die, by use of the motor. The method also comprises measuring angular velocity, by use of the sensor. The method further comprises comparing the measured angular velocity to a first threshold value, whereby if the first threshold value has not been met, the measuring and comparing operations are repeated. If the first threshold value has been met, the method comprises multiplying the measured angular velocity and the time step to produce an angle value. The method also comprises summing the angle value to produce an angular counter value. The method also comprises performing a second comparison of the angular counter value to a second threshold value, whereby if the second threshold value has not been met, the measuring, comparing, multiplying, summing, and second comparing operations are repeated. If the second threshold value has been met, the method comprises discontinuing tool operation or braking tool rotation.

In yet another aspect, the present subject matter provides a method for forming threads in a workpiece using a tool including a tool head having at least one threading die, an electric motor rotatably powering the tool head, a sensor for measuring angular velocity, an angular velocity counter, a timer for measuring a time step, a controller, and memory provisions. The method comprises setting the angular counter to zero. The method also comprises rotating the tool head that includes the at least one threading die, by use of the motor. The method further comprises measuring angular velocity, by use of the sensor. The method further comprises comparing the measured angular velocity to a first threshold value, whereby if the first threshold value has not been met, the measuring and comparing operations are repeated. If the first threshold value has been met, the method comprises measuring angular velocity, by use of the sensor. The method also comprises multiplying the measured angular velocity and the time step to produce an angle value. The method additionally comprises summing the angle value to produce an angular counter value. The method further comprises performing a second comparison of the angular counter value to a second threshold value, whereby if the second threshold value has not been met, the measuring, multiplying, summing, and second comparing operations are repeated. If the second threshold value has been met, the method comprises discontinuing tool operation or braking tool rotation.

In still a further aspect, the present subject matter provides a method for forming threads in a workpiece using a tool including a tool head having at least one threading die, an electric motor rotatably powering the tool head, a sensor for measuring angular velocity, an angular velocity counter, a timer for measuring a time step, a controller, and memory provisions. The method comprises setting the angular counter to zero. The method also comprises rotating the tool head that includes the at least one threading die, by use of the motor. The method also comprises measuring angular velocity, by use of the sensor. The method also comprises comparing the measured angular velocity to a first threshold value, whereby if the first threshold value has not been met, the setting, measuring, and comparing operations are repeated. If the first threshold value has been met, the method comprises multiplying the measured angular velocity and the time step to produce an angle value. The method additionally comprises summing the angle value to produce an angular counter value. The method also comprises performing a second comparison of the angular counter value to a second threshold value, whereby if the second threshold value has not been met, the measuring, comparing, multiplying, summing, and second comparing operations are repeated. If the second threshold value has been met, the method comprises discontinuing tool operation or braking tool rotation.

In yet another aspect, the present subject matter provides a method for forming threads in a workpiece using a tool including a tool head having at least one threading die, an electric motor rotatably powering the tool head, a sensor for measuring angular velocity, an angular velocity counter, a timer for measuring a time step, a controller, and memory provisions. The method comprises setting the angular counter to zero. The method also comprises rotating the tool head that includes the at least one threading die, by use of the motor. The method further comprises measuring angular velocity, by use of the sensor. The method also comprises comparing the measured angular velocity to a first threshold value, whereby if the first threshold value has not been met, multiplying the measured angular velocity and the time step to produce a first angle value, subtracting the angle value from the angular counter, and repeating the measuring and comparing operations. If the first threshold value has been met, the method comprises multiplying the measured angular velocity and the time step to produce a second angle value. The method also comprises summing the second angle value to produce an angular counter value. The method also comprises performing a second comparison of the angular counter value to a second threshold value, whereby if the second threshold value has not been met, the measuring, comparing, multiplying, summing, and second comparing operations are repeated. If the second threshold value has been met, the method comprises discontinuing tool operation or braking tool rotation.

In still another aspect, the present subject matter provides a tool system for performing powered threading operations. The system comprises a tool for threading a workpiece. The system also comprises a trigger to initiate activation of the tool. The system also comprises an electrically powered motor that provides a powered rotary drive. The system also comprises a controller for controlling operation of the motor. The system also comprises at least one of (i) an electrical current sensor, (ii) a rotational velocity sensor, and (iii) an alert. The system also comprises memory provisions for saving data associated with the electrical current sensor, the rotational velocity sensor and/or the alert.

In yet another aspect, the present subject matter provides a method for forming threads in a workpiece using a tool including a tool head having at least one threading die, an electric motor rotatably powering the tool head, a sensor for measuring angular velocity, a controller, and memory provisions. The method comprises rotating the tool head that includes the at least one threading die, by use of the motor. The method also comprises measuring angular velocity, by use of the sensor. The method further comprises determining if an existing angular velocity data set is full, whereby if the existing angular velocity data set is full, the controller removes an oldest angular velocity measurement from a stored data set and the controller adds an angular velocity from the sensor to the stored data set, and whereby if the angular velocity data set is not full, the controller adds the angular velocity from the sensor to the stored data set. The method also comprises summing all stored angular velocity values. The method also comprises comparing an angular velocity data set summation to a first threshold and determining if the first threshold has been met, whereby if the first threshold has not been met, the measuring, determining, summing and comparing operations are repeated, and if the first threshold has been met, discontinuing tool operation or braking tool rotation.

BRIEF DESCRIPTION OF THE DRAWINGS

FIG. 1 is a schematic illustration of a system that includes various components of a tool used for threading a workpiece in accordance with the methods of the present subject matter.

DETAILED DESCRIPTION OF THE EMBODIMENTS

Figure 1A:
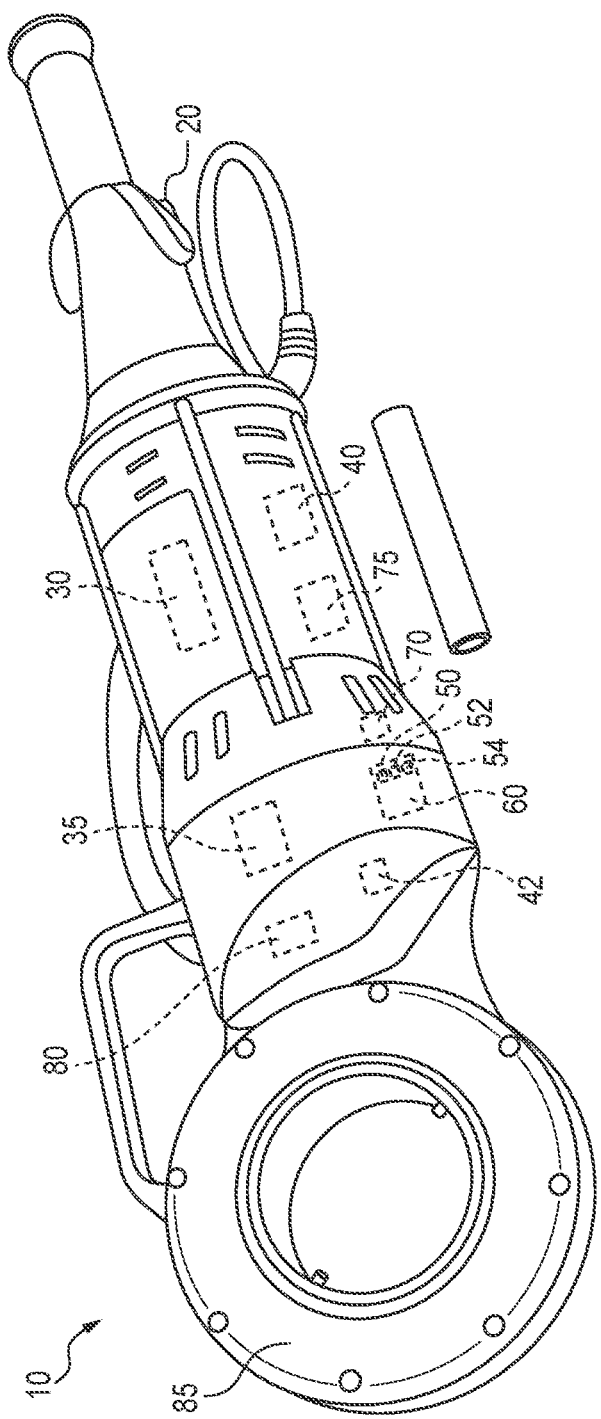
FIG. 1A illustrates an embodiment of a tool in accordance with the present subject matter.

Generally, the present subject matter provides various methods for forming threads in a workpiece, and for controlling and/or monitoring threading of workpieces. The methods are performed in association with a wide array of tools, tool systems, and particularly hand-held power drives with threaders including one or more dies. FIGS. 1 and 1A schematically illustrate an embodiment of a tool system 10 in accordance with the present subject matter. In many embodiments, the tool 10 is configured for performing powered threading operations. The tool 10 comprises a trigger 20 or other component to initiate activation of the tool. The tool 10 also comprises an electrically powered motor 30 that provides a powered rotary drive 35. In certain embodiments, the tool 10 also comprises an electrical current sensor 40 configured to measure electrical current draw or consumption by the motor 30. In certain embodiments, the tool 10 also comprises a rotational or angular velocity sensor 42 which for example can be a gyroscopic sensor. The tool 10 also comprises a controller 60 which typically is in the form of a digital microcontroller or circuit(s). In particular versions described herein, the controller 60 can include or be configured to provide one or more of a counter of motor rotations 50, an angular velocity counter 52, and a timer 54 for measuring preselected or operational time steps, time intervals, or time durations. The tool 10 also comprises one or more memory and/or data storage provisions 70 for storing preselected tool operational parameters. In certain versions, the tool 10 also comprises one or more alerts, signals, or other operator indicators denoted as 75 in FIGS. 1 and 1A. The tool 10 may optionally comprise, or be used in association with, a gearbox or transmission shown as 80 in FIGS. 1 and 1A. The tool 10 comprises or is used in association with a tool head 85 that includes a threader and/or one or more threading die(s), generally shown in as 90 in FIG. 1. A workpiece such as a pipe is shown as 95 in FIG. 1.

In one aspect of the present subject matter, an alert is provided to inform a user performing a threading operation that the end of thread is nearing or has been reached. Methods are also provided for alerting or otherwise informing a user of a threading operation nearing completion or completed.

A variety of thread forms or types are known. The most common thread forms are shown in Table 1 below.

TABLE 1

Common Thread Forms

| SIZE | NPT | | BSPT EUROPE | | BSPT FAR EAST/JAPAN | |
| --- | --- | --- | --- | --- | --- | --- |
| | Thread Length (in) | # Threads | Thread Length (in) | # Threads | Thread Length (in) | # Threads |
| ½" | .78-.64 | 10 | .66-.52 | 8.2 | .86-.71 | 11 |
| ¾" | .79-.65 | 10.1 | .71-.57 | 9 | .86-.71 | 11 |
| 1" | .98-.84 | 10.3 | .84-.66 | 8.2 | 1.09-.91 | 11 |
| 1¼" | 1.01-.83 | 10.6 | .93-.75 | 9.2 | 1.18-1.00 | 12 |
| 1½" | 1.02-.85 | 10.8 | .93-.75 | 9.2 | 1.18-1.00 | 12 |
| 2" | 1.06-.88 | 11.2 | 1.10-.92 | 11.1 | 1.36-1.18 | 14 |

As can be seen in Table 1, the standard number of threads to achieve an NPT (American National Standard Pipe Thread standard often called National Pipe Thread) thread form for a thread from ½" to 2" is between 10.0 and 11.2. Similar variations in rotations for BSPT (British Standard Pipe Taper) thread forms exist as shown in Table 1. To the tool, the complete thread profile is achieved when the number of complete revolutions of the die head (after the dies have begun cutting the thread into the pipe surface) equals the number of threads per the standards.

Figure 2:
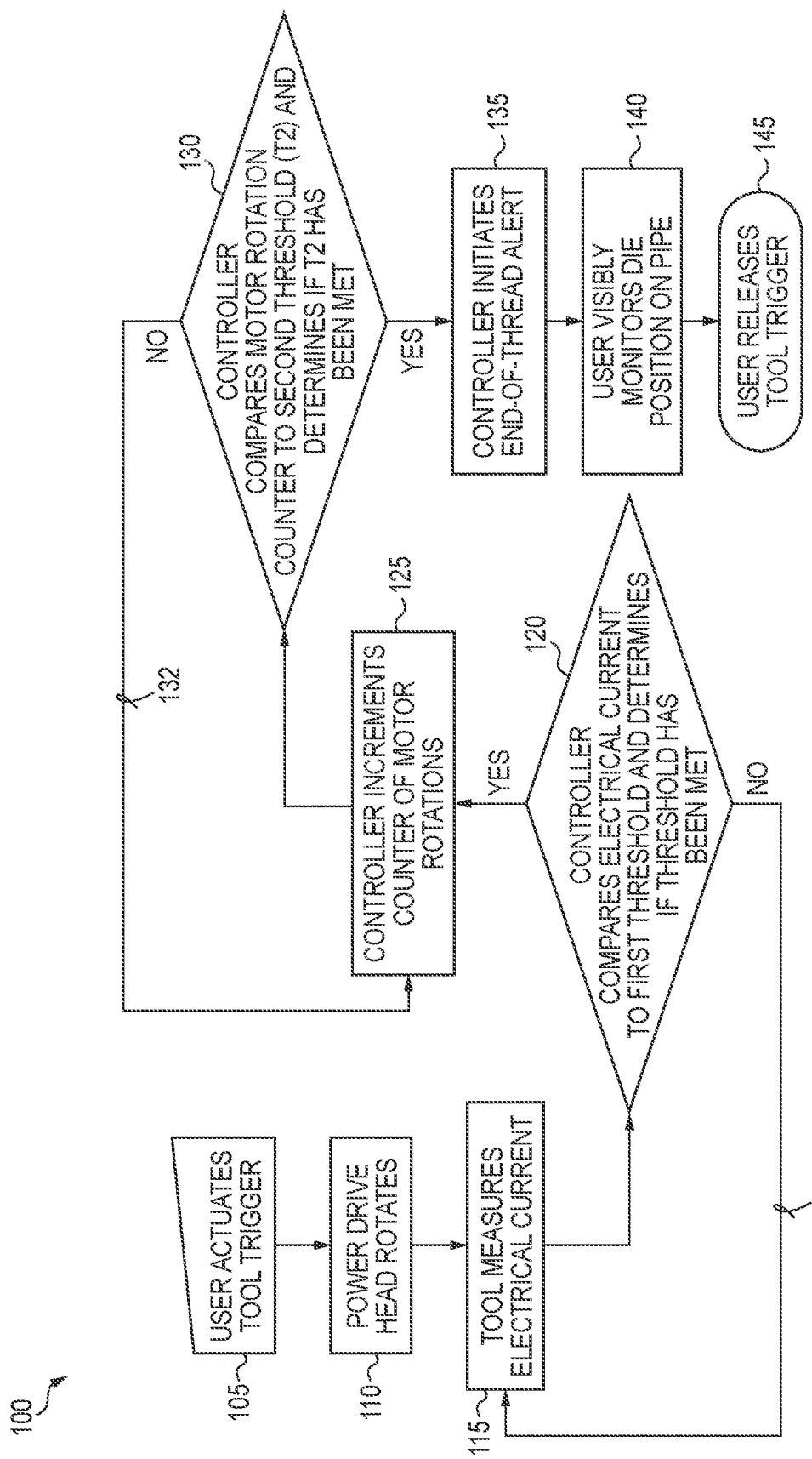
FIG. 2 is a schematic flowchart of an embodiment of a threading operation in accordance with the present subject matter.

By monitoring the electrical current of the tool, a controller can determine when the dies have begun cutting the thread into the pipe surface. When a predetermined threshold current is achieved, the tool controller determines that a thread has begun. Then, sensors monitoring the motor rotation begin counting the number of revolutions of the motor. When a predetermined threshold of motor revolutions is reached (corresponding to the proper number of die head rotations per the thread forms above, via the gear ratio of the tool), an end-of-thread alert will activate, alerting users that their attention should be focused on the exact position of the pipe relative to the dies to determine when a desired thread completion is achieved. FIG. 2 illustrates a schematic flowchart of an embodiment of a threading operation in accordance with the present subject matter.

Specifically, FIG. 2 illustrates a method 100 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring electrical power consumed by the motor, such as sensor 40 in FIG. 1. The tool also includes a controller such as controller 60 shown in FIG. 1. The tool additionally includes a counter of motor rotations such as counter 50 in FIG. 1. The tool also includes memory provisions such as memory 70 in FIG. 1. And the tool also includes an alert for alerting a user such as alert or signal 75 in FIG. 1. The method 100 comprises various operations as follows. In operation 105, a user initiates tool activation such as by actuating a tool trigger. As a result of tool actuation, the tool which for example is a power drive, imparts rotation to a tool head which can for example include threading die(s). This is shown in operation 110. In operation 115, the tool measures electrical power consumed, i.e., electrical current. Such measurement can be performed by sensor 40. A tool controller then compares the electrical current measured to a first threshold value and determines if the threshold has been met, in operation 120. If the first threshold value has not been met, tool operation continues and another measurement of electrical current is made which is then compared to the first threshold value, i.e., operations 115 and 120. These repeated operations are depicted as operational path 122 in FIG. 2. As previously noted, if the first threshold value has been met, this indicates that thread formation has begun. If the first threshold value has been met, the tool controller increments a counter of motor rotations in operation 125. This produces a cumulative motor rotation count. Typically, the counter is configured in the tool controller such as controller 60. In operation 130, the controller performs a second comparison of the cumulative motor rotation count from the motor rotation counter to a second threshold value and determines if the second threshold has been met. If the second threshold value has not been met, tool operation continues and another operation of the controller incrementing the counter of the motor rotations occurs which is then compared to the second threshold, i.e., operations 125 and 130. These repeated operations are depicted as 132 in FIG. 2. As previously noted, if the second threshold value has been met, this indicates that thread formation has been completed, or is nearing completion. If the second threshold value has been met, the tool controller initiates an end-of-thread alert, in operation 135. This signals or otherwise informs the user of an end-of-thread condition. Typically, the user will then visibly monitor or otherwise direct attention to the position of the threading die(s) on the workpiece. This is depicted as operation 140 in FIG. 2. Upon completion of thread formation, the user releases the tool trigger or otherwise de-actuates the tool, as shown by operation 145 in FIG. 2.

In most cases, it is preferred that the threshold current be adequately above the no-load tool current and above a current value required to back-off, or remove, the die head from the completed thread, in order to prevent nuisance alerts when the end of thread is not near. Restated, it is undesirable that the tool consider die head back-off as threading and an end-of-thread alert be initiated during a back-off or similar condition.

Figure 3:
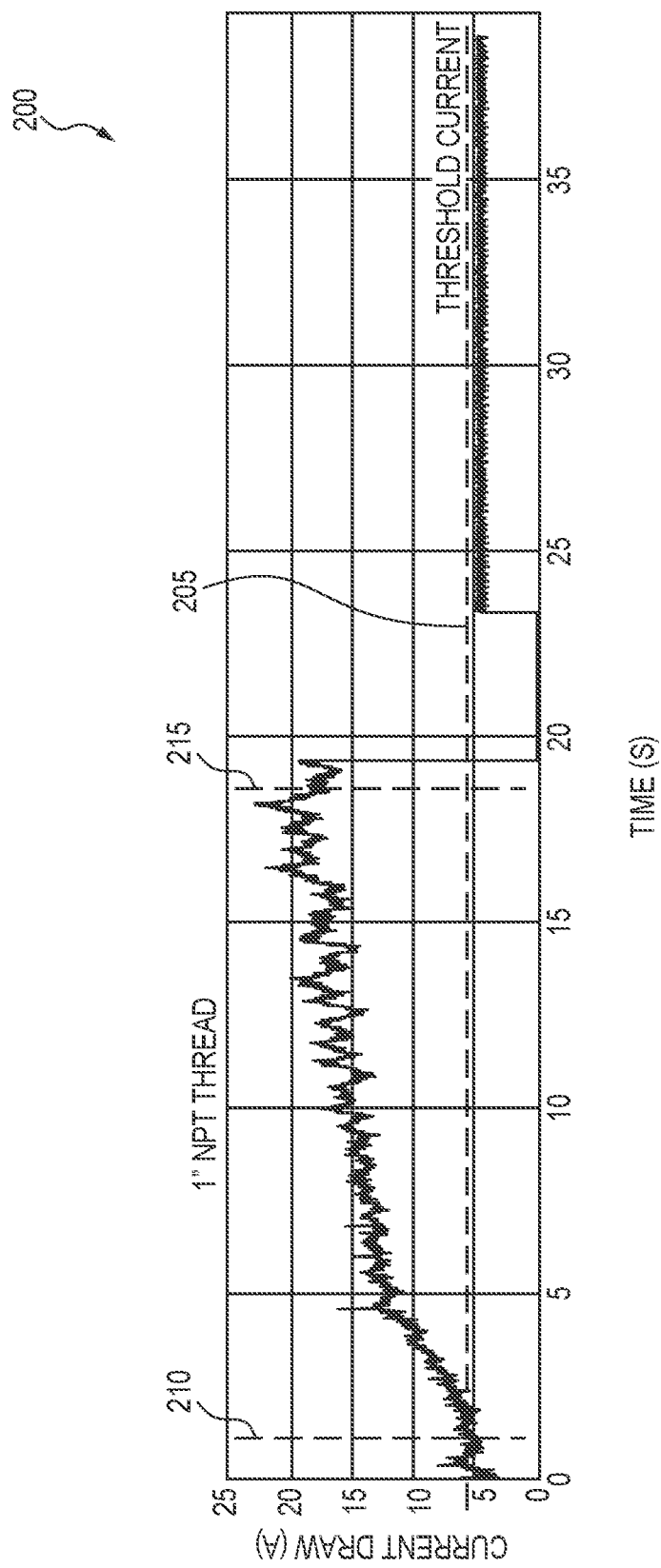
FIG. 3 is a representative tool current profile showing current draw over time during a threading operation.

In the following example, reference a tool current profile 200 shown in FIG. 3 for a typical 1" NPT thread. In this case, using a 60V tool, the no-load electrical current is approximately 4 A (amperes), and the back-off current is about 5 A. The first threshold, set at about 6 A (shown by the horizontal dashed line, 205), is achieved at about 2 seconds into the tool operation (first vertical dashed line, 210 in FIG. 3). At this point, the controller determines that the thread has begun. For approximately the next 17 seconds, the tool controller counts the number of motor rotations until the second threshold, related to the number of threads being made, is reached. In this example, the gear ratio from the die head area of the tool to the motor is 500:1 and the second threshold is 4,500 revolutions (9 revolutions of the die head). When the second threshold is met (second vertical dashed line, 215 in FIG. 3), the end-of-thread alert is initiated. The user discontinues use of the tool when the proper thread form is completed. When the tool is stopped, the alert ceases and subsequent reversal of the tool rotation to remove the dies from the pipe results in no further end-of-thread alert as the back-off current is below the threshold current.

In some cases, if the user does not supply adequate axial force to the die head, directly or indirectly, the dies may not actually bite into the pipe wall and begin forming a thread. In this case, the dies remove material from the end of the pipe and form a chamfer on the outside diameter. The electrical current used by the tool when this occurs is like that used when creating a thread. Therefore, the tool must be able to differentiate the chamfering of the pipe from actual threading in order to prevent inaccurate end-of-thread alerts that may be initiated by the controller. To do so, the controller will confirm that a minimum of number of motor rotations occur at or above the threshold current. If the tool current falls below the threshold current prior to this minimum threshold of motor rotations, the tool controller will reset the motor rotation counter; in this manner, the tool will begin counting motor rotations when the next pipe thread is begun.

In most cases, it is desirable that the tool continue monitoring the number of active die head rotations even if the user discontinues operating the tool during threading. The user may, for example, pause the tool to confirm the position of the dies on the pipe, adjust oiling procedures, or inadvertently lose grip on the tool power switch. If the user stops operating the tool prior to the end of thread but re-engages use, it is preferred that the controller continue counting the motor revolutions and appropriately signal the end-of-thread occurrence when it occurs.

For different operating voltages, the predetermined threshold current will be modified accordingly based on no-load current and back-off current. Similarly, for different operating tool gear ratios, the predetermined threshold motor rotations will be adapted to correspond with a desirable number of die head rotations. Finally, the desired number of die head rotations required to achieve a complete thread may be modified to compensate for user reaction time, different thread profiles (e.g. BSPT), or increased or decreased thread shapes (i.e. over-threaded or under-threaded profiles).

The end-of-thread alert may, in some cases, be a light on the tool that becomes illuminated when the second threshold is met. In other cases, an audible signal may occur to alert the user of the end-of-thread criterion. Other sensory signals may further be employed to communicate this occurrence.

Figure 4:
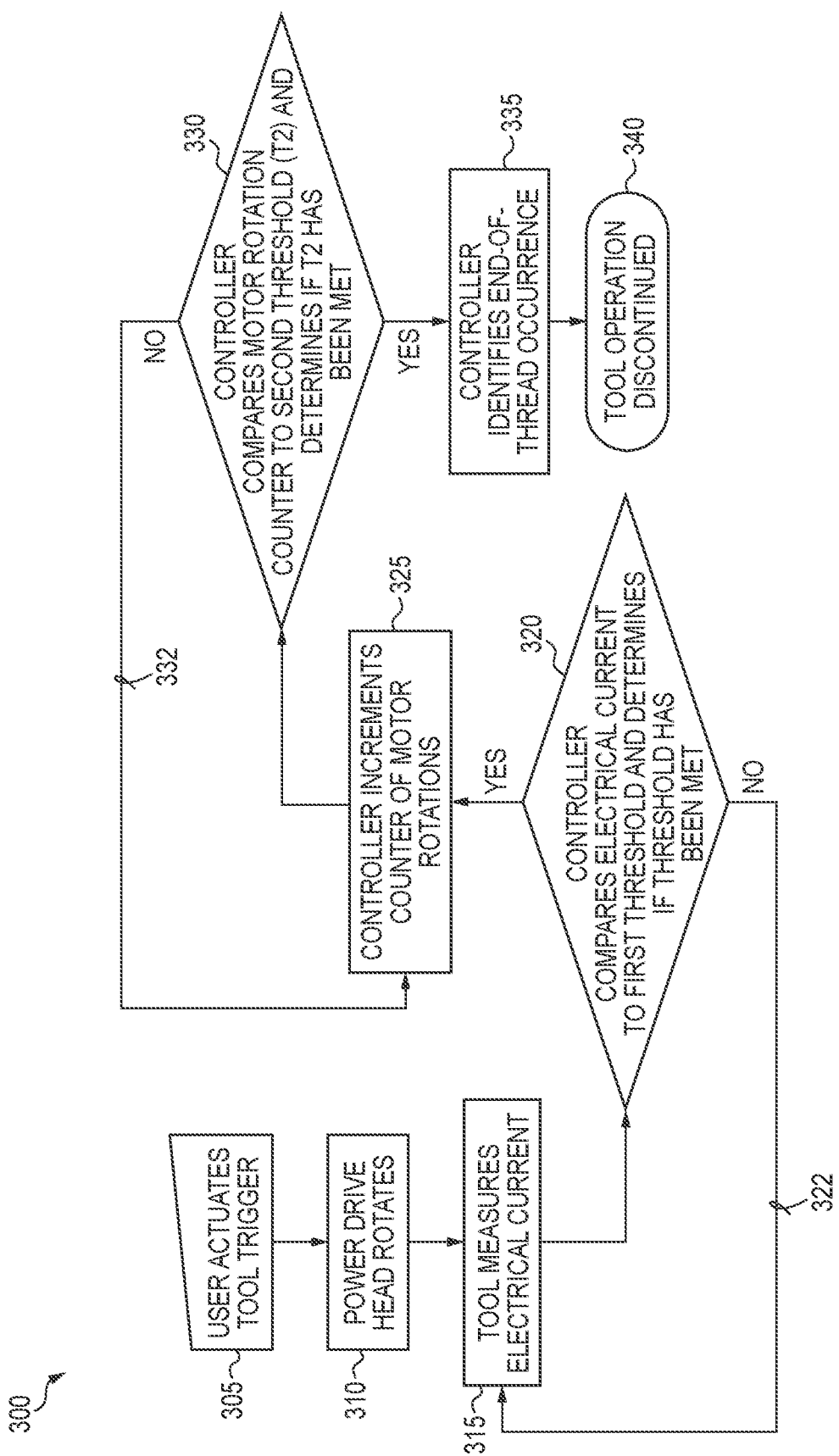
FIG. 4 is a schematic flowchart of another embodiment of a threading operation in accordance with the present subject matter.

In some embodiments, the tool automatically shuts off when the end-of-thread occurrence has been reached. FIG. 4 is a schematic flowchart of another embodiment of a threading operation in accordance with the present subject matter.

Specifically, FIG. 4 illustrates a method 300 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring electrical power consumed by the motor, such as sensor 40 in FIG. 1. The tool also includes a controller such as controller 60 shown in FIG. 1. The tool additionally includes a counter of motor rotations such as counter 50 in FIG. 1. The tool also includes memory provisions such as memory 70 in FIG. 1. The method 300 comprises various operations as follows. In operation 305, a user initiates tool activation such as by actuating a tool trigger. As a result of tool actuation, the tool which for example is a power drive, imparts rotation to a tool head which can for example include threading die(s). This is shown in operation 310. In operation 315, the tool measures electrical power consumed, i.e., electrical current. Such measurement can be performed by sensor 40. A tool controller then compares the electrical current measured to a first threshold value and determines if the threshold has been met, in operation 320. If the first threshold value has not been met, tool operation continues and another measurement of electrical current is made which is then compared to the first threshold value, i.e., operations 315 and 320. These repeated operations are depicted as 322 in FIG. 4. As previously noted, if the first threshold value has been met, this indicates that thread formation has begun. If the first threshold value has been met, the tool controller increments a counter of motor rotations in operation 325. This produces a cumulative motor rotation count. Typically, the counter is configured in the tool controller such as controller 60. In operation 330, the controller performs a second comparison in which the controller compares the motor rotation counter to a second threshold value and determines if the second threshold has been met. If the second threshold value has not been met, tool operation continues and another operation of the controller incrementing the counter of the motor rotations and other comparison occurs, i.e., operations 325 and 330. These repeated operations are depicted as 332 in FIG. 4. As previously noted, if the second threshold value has been met, this indicates that thread formation has been completed, or is nearing completion. If the second threshold value has been met, the tool controller identifies an end-of-thread occurrence, in operation 335. Upon completion of thread formation, tool operation is discontinued, as shown by operation 340 in FIG. 4. The tool controller can be configured to discontinue tool operation.

Figure 5:
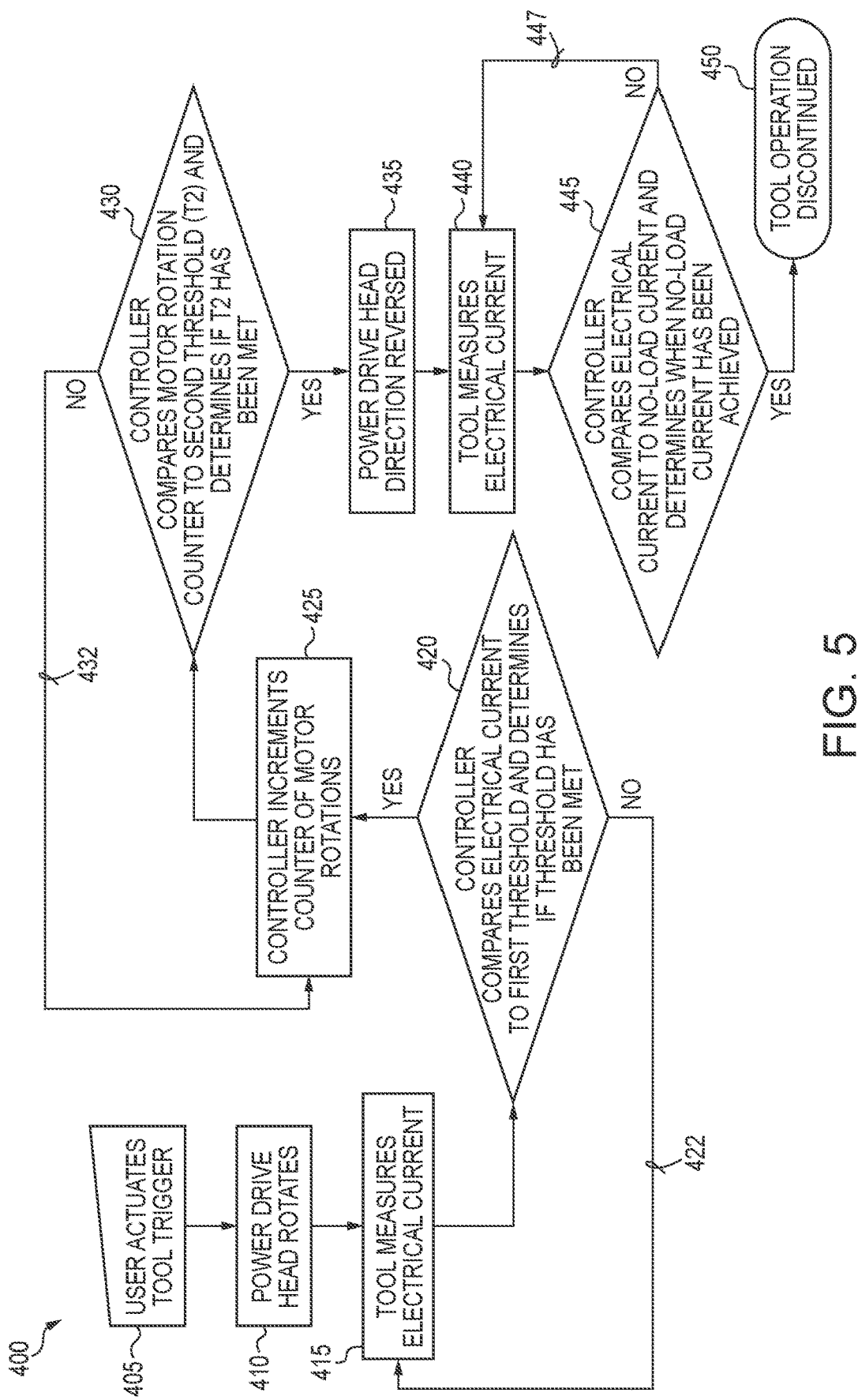
FIG. 5 is a schematic flowchart of another embodiment of a threading operation in accordance with the present subject matter.

In other embodiments, the tool automatically reverses direction after the end-of-thread is reached to back the die head off of the pipe. This reversal may continue until the no-load current is again achieved, signifying the complete removal of the die head from the pipe. FIG. 5 is a schematic flowchart of another embodiment of a threading operation in accordance with the present subject matter.

Specifically, FIG. 5 illustrates a method 400 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring electrical power consumed by the motor, such as sensor 40 in FIG. 1. The tool also includes a controller such as controller 60 shown in FIG. 1. The tool additionally includes a counter of motor rotations such as counter 50 in FIG. 1. The tool also includes memory provisions such as memory 70 in FIG. 1. The method 400 comprises various operations as follows. In operation 405, a user initiates tool activation such as by actuating a tool trigger. As a result of tool actuation, the tool which for example is a power drive, imparts rotation to a tool head which can for example include threading die(s). This is shown in operation 410. In operation 415, the tool measures electrical power consumed, i.e., electrical current. Such measurement can be performed by sensor 40. A tool controller then compares the electrical current measured to a first threshold value and determines if the threshold has been met, in operation 420. If the first threshold value has not been met, tool operation continues and another measurement of electrical current is made which is then compared to the first threshold value, i.e., operations 415 and 420. These repeated operations are depicted as 422 in FIG. 5. As previously noted, if the first threshold value has been met, this indicates that thread formation has begun. If the first threshold value has been met, the tool controller increments a counter of motor rotations in operation 425. This produces a cumulative motor rotation count. Typically, the counter is configured in the tool controller such as controller 60. In operation 430, the controller in a second comparison, compares the motor rotation counter to a second threshold value and determines if the second threshold has been met. If the second threshold value has not been met, tool operation continues and another operation of the controller incrementing the counter of the motor rotations and another comparison occurs, i.e., operations 425 and 430. These repeated operations are depicted as 432 in FIG. 5. As previously noted, if the second threshold value has been met, this indicates that thread formation has been completed, or is nearing completion. If the second threshold value has been met, the power drive head rotation direction is reversed, in operation 435. As previously noted, reversal causes the die head to back off from the pipe. After reversal of drive head direction, the tool measures electrical power consumed, i.e., electrical current, in operation 440. Such measurement can be performed by sensor 40. In operation 445, the tool controller in a third comparison, compares the electrical current measured in operation 440 to a no-load current value and then determines when a no-load current has been achieved. If such no-load current has not been achieved, the tool operation continues and another measurement of electrical current is made which is then compared to the no-load current, i.e., operations 440 and 445. These repeated operations are depicted as 447 in FIG. 5. As previously noted, occurrence of a no-load current at this stage in the method signifies complete removal of the die head from the pipe. If the no-load current has been achieved, tool operation is discontinued as shown in operation 450. The tool controller can be configured to discontinue tool operation.

In another variation of the automatic back-off method or operation(s) described herein, the back-off occurs until the user releases the tool power switch/trigger.

Another aspect of the present subject matter is a method of shutting the tool off if the user loses control. Here, the tool features a sensor, for example a gyroscopic sensor, that detects rotational velocity of the tool or a tool body, frame, or enclosure. When the rotational velocity exceeds a first threshold angular velocity, the tool integrates the measured velocity to determine the approximate angle of rotation that has occurred and compares the angular rotation to a predetermined threshold value. When the angular rotation exceeds this second threshold, the tool shuts off to prevent further rotation.

Figure 6:
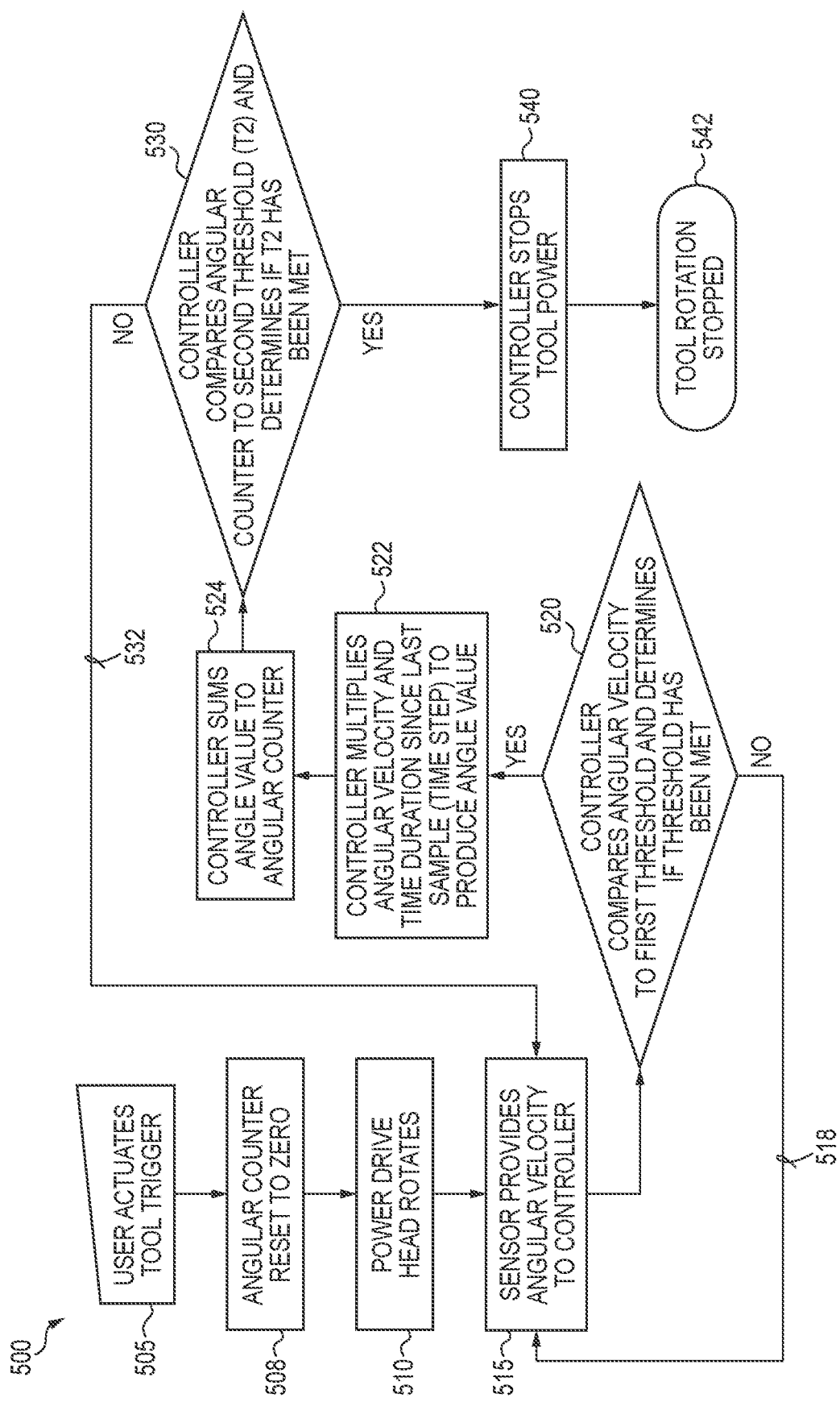
FIG. 6 is a schematic flowchart of another embodiment of a threading operation in accordance with the present subject matter.

As the tool measures the angular velocity via the sensor (e.g. gyroscopic sensor), the tool controller determines the product of the angular velocity and the measurement interval (time step). The tool controller then sums this product to past measurements for those occurrences that exceed the predetermined angular velocity. It is this summation over subsequent measurements (angular counter) that is then compared to the second threshold value. The tool's angular counter starts at zero such that the angular rotation is always relative to the tool's starting position. FIG. 6 is a schematic flowchart of another embodiment of a threading operation in accordance with the present subject matter.

Specifically, FIG. 6 illustrates a method 500 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring rotational velocity or angular velocity, such as sensor 42 in FIG. 1. The tool also includes a controller such as controller 60 shown in FIG. 1. The tool also includes memory provisions such as memory 70 in FIG. 1. The method 500 comprises various operations as follows. In operation 505, a user initiates tool activation such as by actuating a tool trigger. Such actuation resets an angular counter configured in the tool, to zero. Typically, the angular counter is configured in the tool controller such as controller 60. This is shown as operation 508. As a result of tool actuation, the tool which for example is a power drive, imparts rotation to a tool head which can for example include threading die(s). This is shown in operation 510. In operation 515, a rotational velocity (or angular velocity) sensor such as sensor 42, provides measurement of such to a tool controller such as controller 60. The tool controller then compares the angular velocity measured to a first threshold value and determines if the threshold has been met, in operation 520. If the first threshold value has not been met, tool operation continues and another measurement of angular velocity is made which is then compared to the first threshold value. These repeated operations are depicted as 518 in FIG. 6. If the first threshold value has been met, the tool controller multiples the measured angular velocity and the time duration or period since a last sample (or time step) in operation 522 to produce an angle value. Typically, the timer for measuring a time step, time interval, or time duration is configured in the tool controller such as controller 60. Next, the tool controller sums the angle value from 522 to produce an angular counter value in operation 524. In operation 530, the controller in a second comparison, compares the angular counter value to a second threshold value and determines if the second threshold has been met. If the second threshold value has not been met, tool operation continues and another operation of the sensor providing angular velocity to the controller, another comparison, another multiplication, another summation, and another comparison, i.e., operations 515, 520, 522, 524, and 530 are performed. These repeated operations are depicted as 532 in FIG. 6. If the second threshold value has been met, the tool controller stops or terminates tool power in operation 540. As a result of discontinuing tool power, tool rotation stops. This is shown as operation 542.

In the example detailed below and shown in Table 2, the first threshold angular velocity is 70 degrees per second (°/s) and the second threshold angular rotation is 35°. The time step (measurement interval) is 0.05 seconds. As can be seen, the angular counter starts calculating the angular displacement after the first threshold (70°/s) is met. Then, the measured angular velocity is multiplied by the time step to produce an angle value for the angular counter. Subsequent measurements result in summation to the angular counter until the second threshold (35°) is attained. At this point (0.6 s total, or 0.45 seconds since the first threshold was met), the tool stops.

TABLE 2

Angular Velocity and Angular Displacement During a Threading Operation

| Time (s) | Angular Velocity (°/s) | Angular Counter (°) |
| --- | --- | --- |
| 0.05 | 0 | 0 |
| 0.1 | 60 | 0 |
| 0.15 | 70 | 3.5 |
| 0.2 | 70 | 7 |
| 0.25 | 70 | 10.5 |
| 0.3 | 70 | 14 |
| 0.35 | 70 | 17.5 |
| 0.4 | 70 | 21 |
| 0.45 | 70 | 24.5 |
| 0.5 | 70 | 28 |
| 0.55 | 70 | 31.5 |
| 0.6 | 70 | 35 |

In another example below and shown in Table 3, the same threshold values have been applied. In this case, however, the measured angular velocity has changed during the tool's use. Again, the tool begins calculating the angular displacement when the first threshold (70°/s) is met (at time=0.15 s). Here, though, the increased angular velocity causes the second threshold (35°) to be met sooner than in the previous example (0.5 s total, or 0.35 seconds since the first threshold was met). The tool stops operating because the second threshold has been met.

TABLE 3

Angular Velocity and Angular Displacement During a Threading Operation

| Time (s) | Angular Velocity (°/s) | Angular Counter (°) |
| --- | --- | --- |
| 0.05 | 0 | 0 |
| 0.1 | 60 | 0 |
| 0.15 | 70 | 3.5 |
| 0.2 | 80 | 7.5 |
| 0.25 | 85 | 11.75 |
| 0.3 | 90 | 16.25 |
| 0.35 | 100 | 21.25 |
| 0.4 | 100 | 26.25 |
| 0.45 | 100 | 31.25 |
| 0.5 | 100 | 36.25 |

Figure 7:
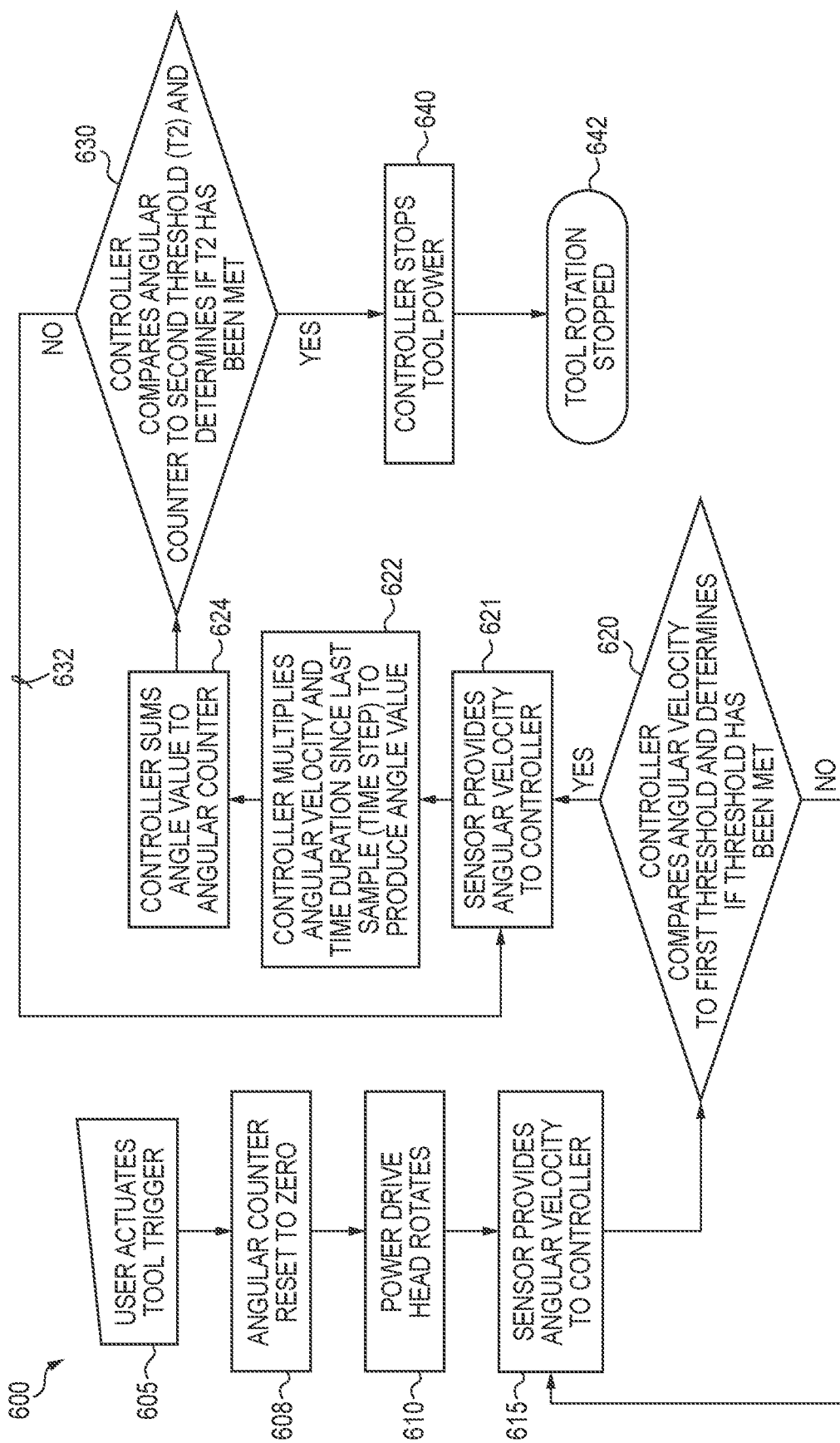
FIG. 7 is a schematic flowchart of another embodiment of a threading operation in accordance with the present subject matter.

In some embodiments, summarized in FIG. 7, the angular counter continues to be summed with additional angular rotation even if angular velocity values below the first threshold are subsequently measured. FIG. 7 is a schematic flowchart of another embodiment of a threading operation in accordance with the present subject matter.

Specifically, FIG. 7 illustrates a method 600 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring rotational velocity or angular velocity, such as sensor 42 in FIG. 1. The tool also includes a controller such as controller 60 shown in FIG. 1. The tool also includes memory provisions such as memory 70 in FIG. 1. The method 600 comprises various operations as follows. In operation 605, a user initiates tool activation such as by actuating a tool trigger. Such actuation resets an angular counter configured in the tool, to zero. Typically, the angular counter is configured in the tool controller such as counter 60. This is shown as operation 608. As a result of tool actuation, the tool which for example is a power drive, imparts rotation to a tool head which can for example include threading die(s). This is shown in operation 610. In operation 615, a rotational velocity (or angular velocity) sensor provides measurement of such to a tool controller such as controller 60. The tool controller then compares the angular velocity measured to a first threshold value and determines if the threshold has been met, in operation 620. If the first threshold value has not been met, tool operation continues and another measurement of angular velocity is made which is then compared to the first threshold value. These repeated operations are depicted as 618 in FIG. 7. If the first threshold value has been met, an angular velocity measurement from a sensor such as sensor 42, is provided to the tool controller in operation 621. The tool controller multiples the measured angular velocity and time duration since a last sample (or time step) in operation 622 to produce an angle value. Typically, the timer for measuring a time step, time interval, or time duration is configured in the tool controller such as controller 60. Next, the tool controller sums the angle value from operation 622 to produce an angular counter value in operation 624. In operation 630, the controller in a second comparison, compares the angular counter to a second threshold value and determines if the second threshold has been met. If the second threshold value has not been met, tool operation continues and another operation of the sensor providing angular velocity to the controller is performed, another multiplication, another summation, and another comparison occurs, i.e., operations 621, 622, 624, and 630. These repeated operations are depicted as 632 in FIG. 7. If the second threshold value has been met, the tool controller stops or terminates tool power in operation 640. As a result of discontinuing tool power, tool rotation stops. This is shown as operation 642.

Referring to Table 4 below, as can be seen, the angular counter begins at 0.15 s when the angular velocity exceeds the first threshold and continues to be increased until the tool shuts off when the second threshold is met. As also can be seen, there are two measurements (at 0.55 s and 0.60 s) where no angular velocity is measured. Here, the angular counter remains at the previously measured value, but continues to be increased upon subsequent measurements where an angular velocity is again measured (even if below the original first threshold).

TABLE 4

Angular Velocity and Angular Displacement During a Threading Operation

| Time (s) | Angular Velocity (°/s) | Angular Counter (°) |
|---|---|---|
| 0.05 | 0 | 0 |
| 0.1 | 60 | 0 |
| 0.15 | 70 | 3.5 |
| 0.2 | 80 | 7.5 |
| 0.25 | 85 | 11.75 |
| 0.3 | 90 | 16.25 |
| 0.35 | 100 | 21.25 |
| 0.4 | 50 | 23.75 |
| 0.45 | 40 | 25.75 |
| 0.5 | 40 | 27.75 |
| 0.55 | 0 | 27.75 |
| 0.6 | 0 | 27.75 |
| 0.65 | 40 | 29.75 |
| 0.7 | 40 | 31.75 |
| 0.75 | 40 | 33.75 |
| 0.8 | 40 | 35.75 |

Figure 8:
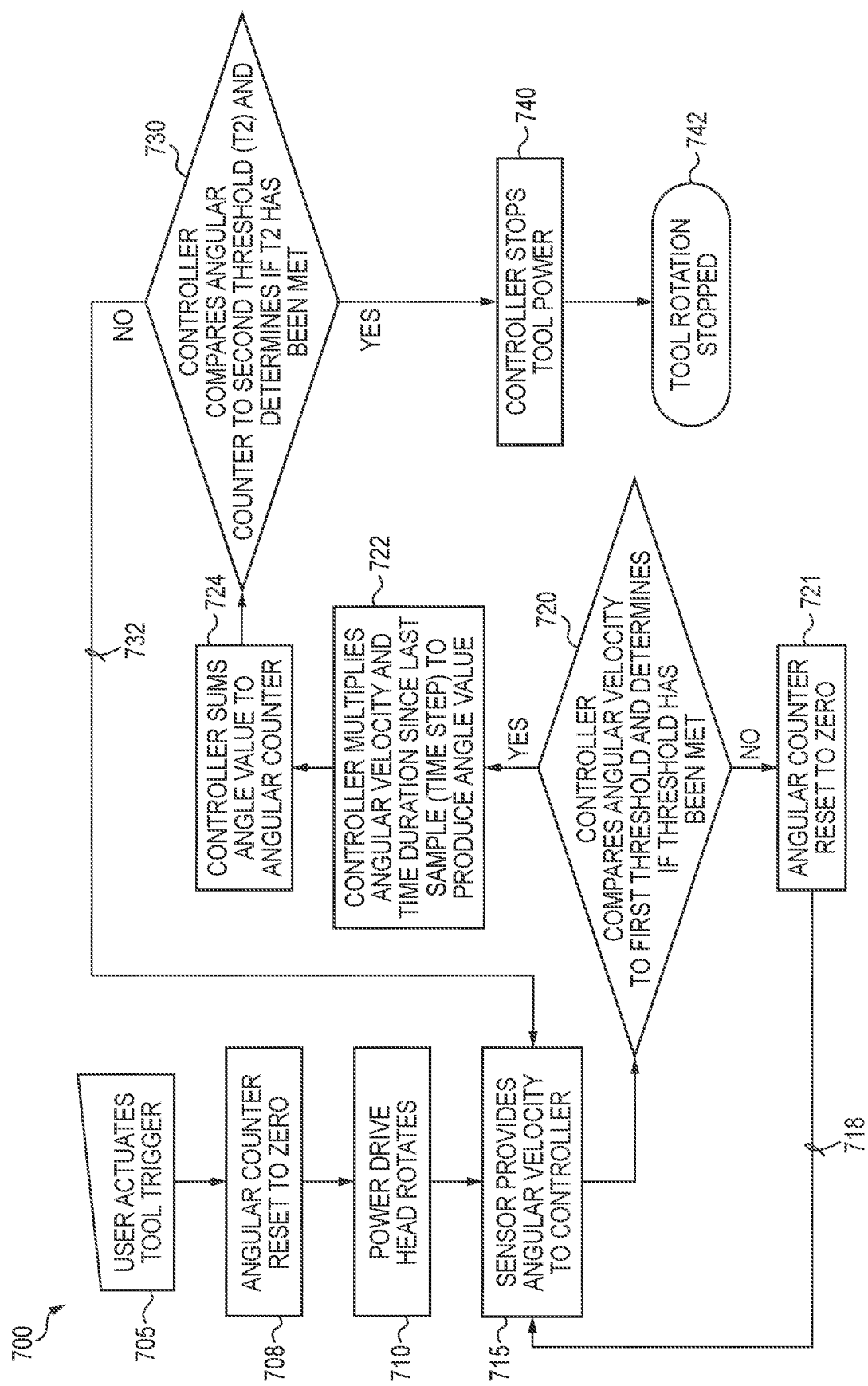
FIG. 8 is a schematic flowchart of another embodiment of a threading operation in accordance with the present subject matter.

In another embodiment, the angular counter resets if an angular velocity measurement below the angular velocity threshold is measured. FIG. 8 illustrates another schematic flowchart of a threading operation in accordance with the present subject matter.

Specifically, FIG. 8 illustrates a method 700 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring rotational velocity or angular velocity, such as sensor 42 in FIG. 1. The tool also includes a controller such as controller 60 shown in FIG. 1. The tool also includes memory provisions such as memory 70 in FIG. 1. The method 700 comprises various operations as follows. In operation 705, a user initiates tool activation such as by actuating a tool trigger. Such actuation resets an angular counter configured in the tool, to zero. Typically, the angular counter is configured in the tool controller such as controller 60. This is shown as operation 708. As a result of tool actuation, the tool which for example is a power drive, imparts rotation to a tool head which can for example include threading die(s). This is shown in operation 710. In operation 715, a rotational velocity (or angular velocity) sensor such as sensor 42 provides measurement of such to a tool controller. The tool controller then compares the angular velocity measured to a first threshold value and determines if the threshold has been met, in operation 720. If the first threshold value has not been met, the angular counter is reset to zero in operation 721 and tool operation continues and another measurement of angular velocity is made which is then compared to the first threshold value, i.e., operations 715 and 720. These repeated operations are depicted as 718 in FIG. 8. If the first threshold value has been met, the tool controller multiples the measured angular velocity and time duration since a last sample (or time step) in operation 722 to produce an angle value. Typically, the timer for measuring a time step, time interval, or time duration is configured in the tool controller such as controller 60. Next, the tool controller sums the angle value from operation 722 to produce an angular counter value in operation 724. In operation 730, the controller in a second comparison, compares the angular counter value to a second threshold value and determines if the second threshold has been met. If the second threshold value has not been met, tool operation continues and another operation of the sensor providing angular velocity to the controller, another comparison, another multiplication, another summation, and another comparison occurs, i.e., operations 715, 720, 722, 724, and 730. These repeated operations are depicted as 732 in FIG. 8. If the second threshold value has been met, the tool controller stops or terminates tool power in operation 740. As a result of discontinuing tool power, tool rotation stops. This is shown as operation 742.

In this example, summarized in Table 5 below, the angular counter begins accumulating angular displacement, but resets when an angular velocity measurement below the first threshold occurs (at 0.4 s). The angular counter remains at zero until a new angular velocity measurement above the first threshold is achieved.

TABLE 5

Angular Velocity and Angular Displacement
During a Threading Operation

| Time (s) | Angular Velocity (°/s) | Angular Counter (°) |
|---|---|---|
| 0.05 | 0 | 0 |
| 0.1 | 60 | 0 |
| 0.15 | 70 | 3.5 |
| 0.2 | 80 | 7.5 |
| 0.25 | 85 | 11.75 |
| 0.3 | 90 | 16.25 |
| 0.35 | 100 | 21.25 |
| 0.4 | 50 | 0 |
| 0.45 | 40 | 0 |
| 0.5 | 40 | 0 |
| 0.55 | 0 | 0 |
| 0.6 | 75 | 3.75 |
| 0.65 | 85 | 8 |
| 0.7 | 100 | 13 |
| 0.75 | 110 | 18.5 |
| 0.8 | 100 | 23.5 |
| 0.85 | 100 | 28.5 |
| 0.9 | 110 | 34 |
| 0.95 | 100 | 39 |

Figure 9:
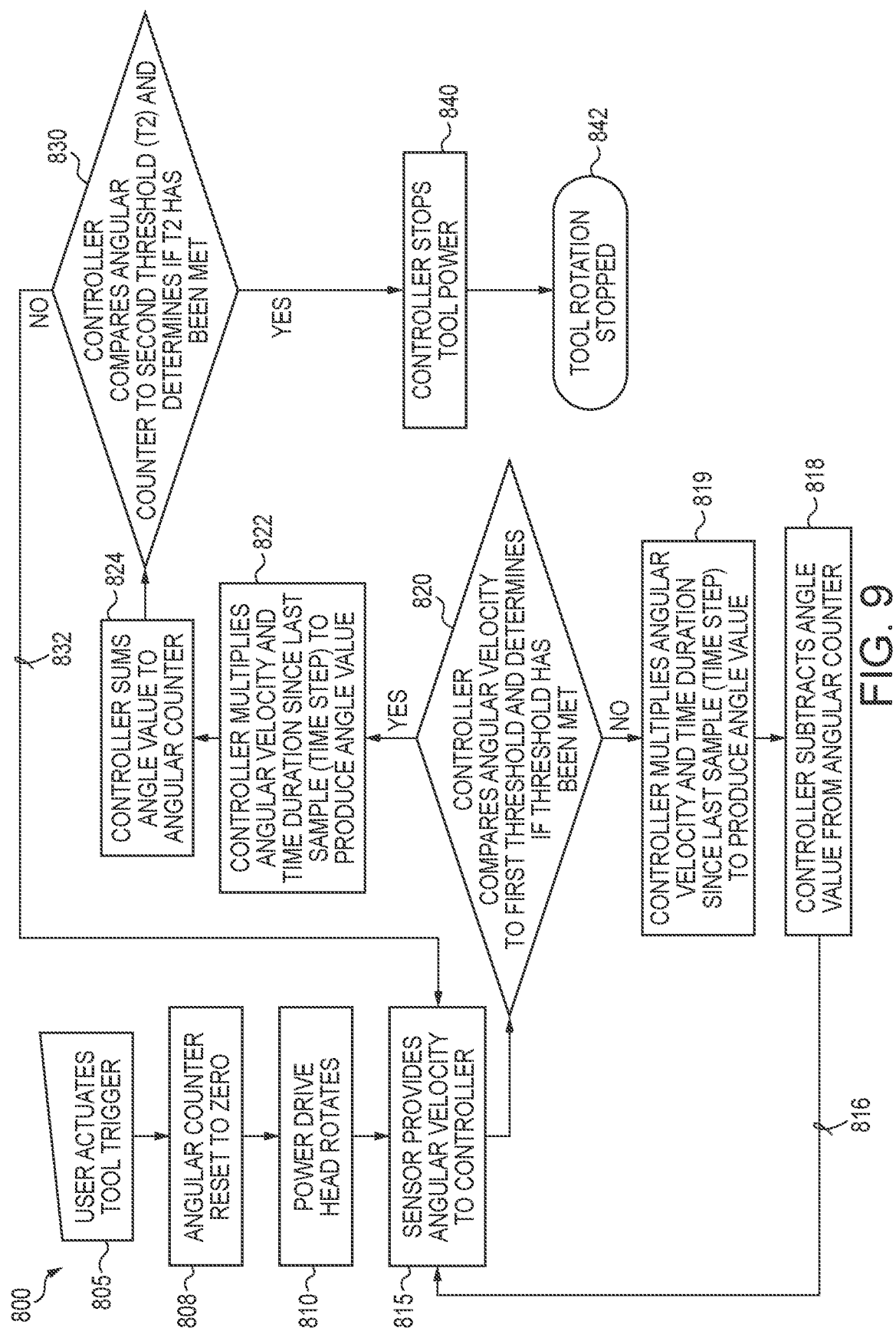
FIG. 9 is a schematic flowchart of another embodiment of a threading operation in accordance with the present subject matter.

In yet another embodiment, the angular counter is reduced if an angular velocity measurement below the angular velocity threshold is measured. FIG. 9 is a schematic flowchart of another embodiment of a threading operation in accordance with the present subject matter.

Specifically, FIG. 9 illustrates a method 800 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring rotational velocity or angular velocity, such as sensor 42 in FIG. 1. The tool also includes a controller such as controller 60 shown in FIG. 1. The tool also includes memory provisions such as memory 70 in FIG. 1. The method 800 comprises various operations as follows. In operation 805, a user initiates tool activation such as by actuating a tool trigger. Such actuation resets an angular counter configured in the tool, to zero. Typically, the angular counter is configured in the tool controller such as controller 60. This is shown as operation 808. As a result of tool actuation, the tool which for example is a power drive, imparts rotation to a tool head which can for example include threading die(s). This is shown in operation 810. In operation 815, a rotational velocity (or angular velocity) sensor such as sensor 42, provides measurement of such to a tool controller. The tool controller then compares the angular velocity measured to a first threshold value and determines if the threshold has been met, in operation 820. If the first threshold value has not been met, the tool controller multiplies the angular velocity and time duration since the last sample (time step) in operation 819 to produce a first angle value. The controller then subtracts this angle value produced in operation 819 from the angular counter in operation 818. Tool operation continues and another measurement of angular velocity is made which is then compared to the first threshold value, i.e., operations 815 and 820. These repeated operations are depicted as 816 in FIG. 9. If the first threshold value has been met in operation 820, the tool controller multiples the measured angular velocity and time duration since a last sample (or time step) in operation 822 to produce a second angle value. Typically, the timer for measuring a time step, time interval, or time duration is configured in the tool controller such as controller 60. Next, the tool controller sums the second angle value to the angular counter in operation 824. In operation 830, the controller in a second comparison, compares the angular counter to a second threshold value and determines if the second threshold has been met. If the second threshold value has not been met, tool operation continues and another operation of the sensor providing angular velocity to the controller, another comparison, another multiplication, another summation, and another comparison occurs, i.e., operations 815, 820, 822, 824, and 830. These repeated operations are depicted as 832 in FIG. 9. If the second threshold value has been met, the tool controller stops or terminates tool power in operation 840. As a result of discontinuing tool power, tool rotation stops. This is shown as operation 842.

In the following example and shown in Table 6, the angular counter performs as previously described until an angular velocity below the first threshold is measured (0.4 seconds). Then, the angular counter is reduced by an equivalent angular rotation value to help "softly reset" the angular counter. Whenever angular velocity values above the first threshold are measured, the angular counter is again summed like before until the second threshold is met.

TABLE 6

Angular Velocity and Angular Displacement
During a Threading Operation

| Time (s) | Angular Velocity (°/s) | Angular Counter (°) |
|---|---|---|
| 0.05 | 0 | 0 |
| 0.1 | 60 | 0 |
| 0.15 | 70 | 3.5 |
| 0.2 | 80 | 7.5 |
| 0.25 | 85 | 11.75 |
| 0.3 | 90 | 16.25 |
| 0.35 | 100 | 21.25 |
| 0.4 | 50 | 18.75 |
| 0.45 | 40 | 16.75 |
| 0.5 | 40 | 14.75 |
| 0.55 | 75 | 18.5 |
| 0.6 | 75 | 22.25 |
| 0.65 | 85 | 26.5 |
| 0.7 | 100 | 31.5 |
| 0.75 | 110 | 37 |

Figure 10:
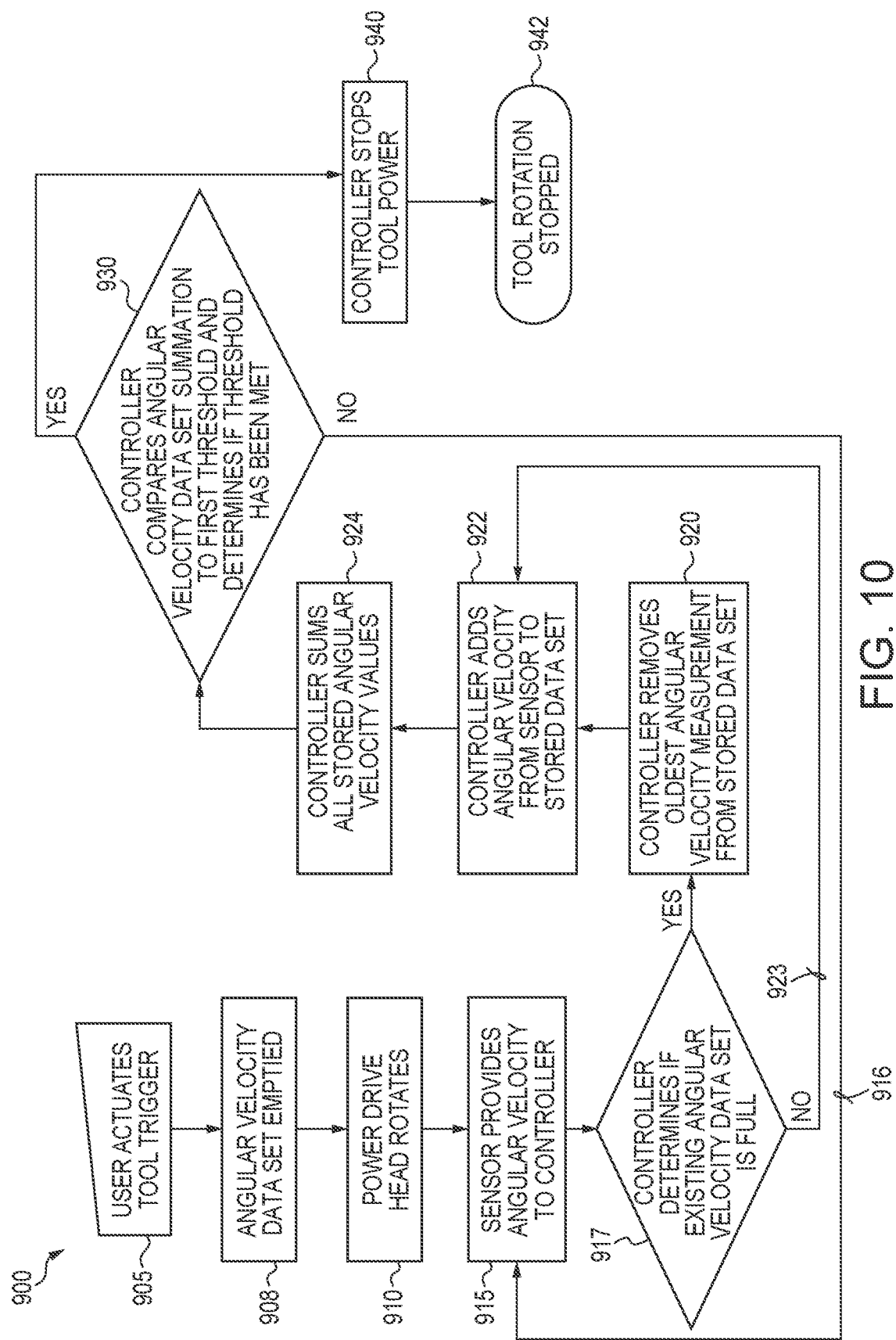
FIG. 10 is a schematic flowchart of another embodiment of a threading operation in accordance with the present subject matter.

Specifically, FIG. 10 illustrates a method 900 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring rotational velocity or angular velocity, such as sensor 42 in FIG. 1. The tool also includes a controller such as controller 60 shown in FIG. 1. The tool also includes memory provisions such as memory 70 in FIG. 1. The method 900 comprises various operations as follows. In operation 905, a user initiates tool activation such as by actuating a tool trigger. Such actuation resets or empties an angular velocity data set configured in the tool, to zero. Typically, the angular velocity data set is configured in the tool controller such as controller 60. This is shown as operation 908. As a result of tool actuation, the tool which for example is a power drive, imparts rotation to a tool head which can for example include threading die(s). This is shown in operation 910. In operation 915, a rotational velocity (or angular velocity) sensor such as sensor 42, provides measurement of such to a tool controller. The tool controller then determines if an existing angular velocity data set is full, in operation 917. If the data set is full, the controller removes the oldest angular velocity measurement from a stored data set as shown in operation 920. The method 900 then proceeds to operation 922. If the data set is not full, the controller adds angular velocity from the sensor to the stored data set. This is shown as operations 922, 923. The controller sums all stored angular velocity values in operation 924. In operation 930, the controller compares angular velocity data set summation to a first threshold and determines if the threshold has been met. If the threshold has not been met, the method is redirected via operation 916 to operation 915 in which the sensor provides angular velocity to the controller. If the threshold has been met, the controller stops tool power as shown in operation 940. As a result of discontinuing tool power, tool rotation stops. This is shown as operation 942.

In the method 900 illustrated in FIG. 10, the multiplication of velocity and time step is removed prior to the summation of values, as in other methods described herein. Since a time step is constant, this could be eliminated with the same net result. In addition, as compared to other methods described herein, a finite data set of measurements is used for the summation instead of relying on threshold(s). Furthermore, velocity can be directional and therefore, negative velocity results in a reduced summation, or absolute where only the magnitude contributes.

The method 900 illustrated in FIG. 10 is similar to the methods depicted in FIGS. 6-9, but differs primarily in the elimination of the multiplication operation(s) and the use of a stored data set that is summed as a constantly rolling data group. The method of FIG. 10 and potentially other methods, can utilize a sensor such as a gyroscopic sensor and a controller such as a microprocessor performing the requisite analysis.

In the previously described methods, direction of rotation can be considered, and the tool power discontinued regardless of clockwise or counterclockwise angular rotation. Similarly, the methods can feature reduction in angular counter values if the direction of angular velocity changes. For example, if the tool initially rotates clockwise at an angular velocity exceeding the first threshold and begins providing values to the angular counter, but the angular velocity changes direction (to counterclockwise), the angular counter could be reduced by the appropriate product of the angular velocity and time step. In this manner, counter-reaction of the user to unexpected angular rotation would be compensated for within the controller logic.

By integrating the angular velocity measurements to determine the angular rotation, the tool can stop more consistently at a known rotational position relative to the beginning position. This allows the tool to be used at any number of initial angular positions since the absolute angle is of no importance; this provides more flexibility in use. Further, this allows the tool to encounter very brief instances of elevated angular velocity without shut-down if the angular rotation threshold (second threshold) is not encountered; this prevents nuisance shut-offs where the tool may quickly react to high torque but is countered by the end user prior to loss in control.

If a non-zero angular velocity threshold is used to begin the angular counter, it allows use in applications that require the user to vary the angular position of the tool during use for improved ergonomics and flexibility. Through controlled rotation of the tool during use, below the first threshold of angular velocity, the tool would continue operating while the operator varied the position of the tool to accommodate the desired operating position. In some embodiments, a zero angular velocity threshold may be used instead.

In a particular embodiment, the unit power is discontinued when the second threshold is met. In another embodiment, dynamic braking could be used to actively slow or stop the tool rotation. In yet another aspect, the design could use the active braking to charge the battery. This regeneration could allow for increased energy capacity in the battery instead of wasteful losses. Thus in several of the methods described herein, in the event a particular event or events occur that trigger discontinuing tool operation, the methods also encompass braking tool rotation instead of, or in addition to, discontinuing tool rotation. A further option is to reverse the motor for a short period of time until the motor stops rotation.

The end-of-thread alert provides a more efficient means of operating the tool, reducing the likelihood of the user over-threading and spending more time operating the tool than the job would require (labor and cost savings).

In addition, the alert allows the user to focus more closely on oiling while threading, then focusing on the end of the pipe as it nears the end of the dies and corresponding end of ideal thread form.

Less skilled operators can work more consistently and with less training due to the end-of-thread alert that promotes proper thread forms.

A primary advantage gained in the torque reaction shut-off (anti-kickback) feature is reduced operator risk during use should the operator lose control. A significant benefit of this aspect of the present subject matter method relative to others in the industry is the greater consistency in stopping angle, and reduced nuisance shut-offs.

In an alternate design, the end-of-thread alert could be initiated after a predetermined duration of threading time after the thread is begun instead of dependence on the number of tool die head rotations. The steady state current or current signature can be used to detect the material and size of pipe or workpiece. Then, a rotational speed is determined utilizing time. The present subject matter also includes other methods to ensure a constant speed motor control, to aid is assessing how long to run the device, i.e., threader, to detect a desired thread length.

Instead of basing the end-of-thread occurrence on a specific number of tool rotations that result in an average number of threads formed, the tool could feature an interface to the operator that allows the operator to input the type or size of thread being made. Then, the tool could determine the exact proper number of thread rotations desired for that specific size or thread type. Similarly, there could be an adjustment procedure that allows the user to increase or decrease the number of die head rotations from the baseline that occur before the end-of-thread sequence is initiated.

In another embodiment, each die head could contain an identifying feature set that allows the tool to detect what size of thread is being made. In one aspect, the features could be mechanical machined features (e.g., holes or slots) that the tool senses using an onboard sensor. By having a unique set based on size or quantity, the tool could then differentiate between the thread types/sizes. In another aspect, the die head could feature a tag or even a transmitting device (for example, an RFID tag or an electrical identifier such as a resistor) that the tool interacts with, determining the thread type/size based on the die head that is inserted.

The determination of the tool that the thread has begun could vary from the current threshold discussed previously. In another embodiment, the rate of change in current could be used to determine that a thread has begun; in this case, if the rate of change of current exceeds a predetermined threshold, the tool determines that the thread has begun and begins counting (motor rotations or time) to determine when the end-of-thread alert should be initiated.

In many applications and embodiments, the methods use a 60 millisecond moving time window (or a finite number of readings) in which angular velocity is summed. If the summation exceeds 4000 deg/second, then a shutdown sequence can be initiated. Alternatively, a user can trigger shut off or discontinuing operation and/or power to the device. It will be understood that the present subject matter includes a wide range of values and/or parameters and is not limited to any of the representative values disclosed herein.

Figure 12:
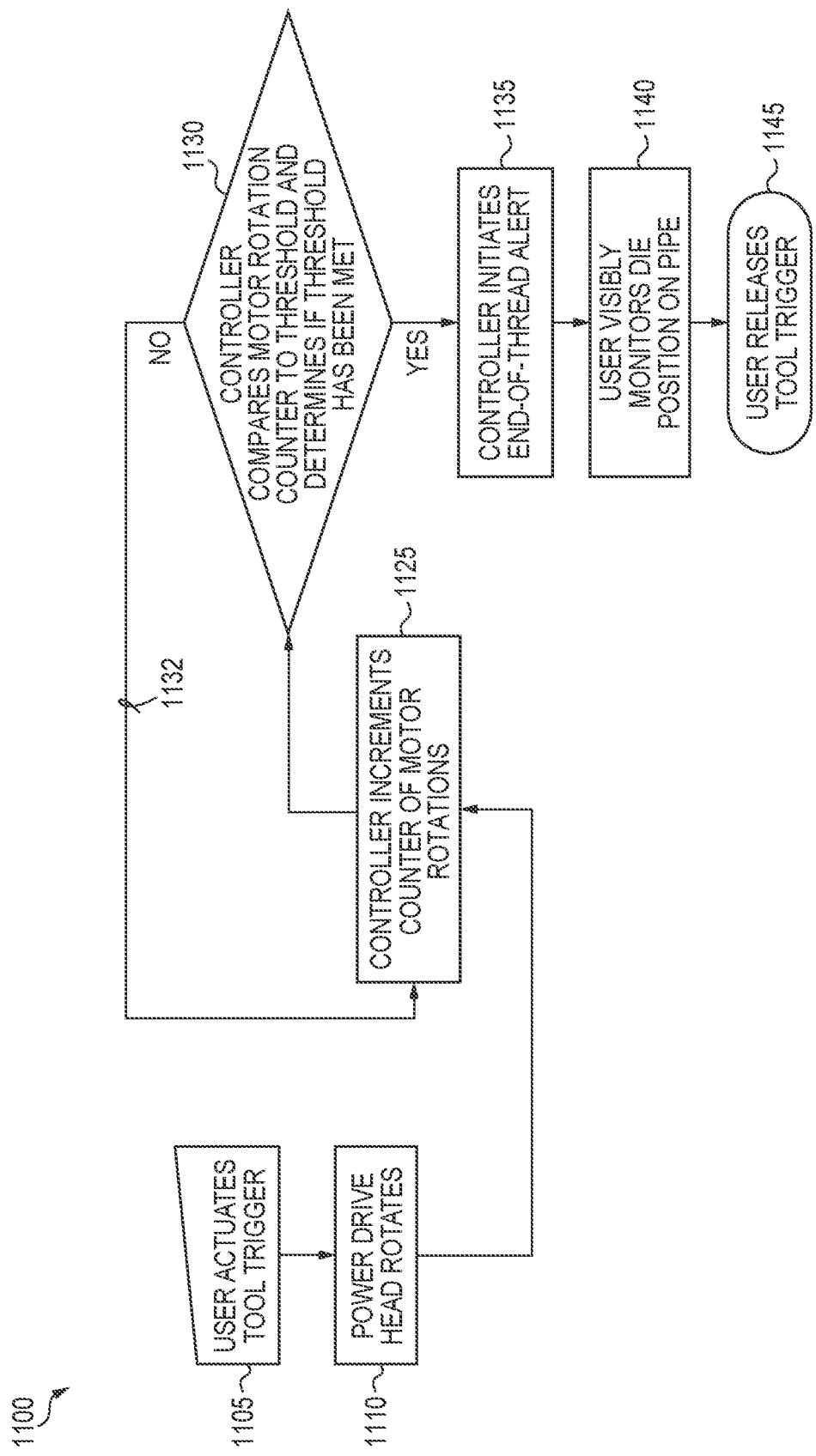
FIG. 12 is a schematic flowchart of another embodiment of a threading operation in accordance with the present subject matter.

In alternate versions or modified versions of the methods, the first threshold value or reference to a threshold value is eliminated, and instead the method begins counting motor rotations (or another parameter) immediately upon tool trigger actuation. For example, FIG. 12 illustrates a method which does not utilize electrical current verification. Specifically, FIG. 12 illustrates a method 1100 for forming threads in a workpiece in accordance with the present subject matter. The method is generally performed using a tool 10 that includes a tool head such as tool head 85 in FIG. 1, which includes at least one threading die such as die 90 in FIG. 1. The tool may also include an electric motor such as motor 30 rotatably powering the tool head. The tool also includes a sensor for measuring electrical power consumed by the motor, such as sensor 40 in FIG. 1. The tool also includes a controller such as controller 60 shown in FIG. 1. The tool additionally includes a counter of motor rotations such as counter 50 in FIG. 1. The tool also includes memory provisions such as memory 70 in FIG. 1. And the tool also includes an alert for alerting a user such as alert or signal 75 in FIG. 1. The method 1100 comprises various operations as follows. In operation 1105, a user initiates tool activation such as by actuating a tool trigger. As a result of tool actuation, the tool which for example is a power drive, imparts rotation to a tool head which can for example include threading die(s). This is shown in operation 1110. The tool controller increments a counter of motor rotations in operation 1125. This produces a cumulative motor rotation count. Typically, the counter is configured in the tool controller such as controller 60. In operation 1130, the controller performs a comparison of the cumulative motor rotation count from the motor rotation counter to a threshold value and determines if the threshold has been met. If the threshold value has not been met, tool operation continues and another operation of the controller incrementing the counter of the motor rotations occurs which is then compared to the threshold, i.e., operations 1125 and 1130. These repeated operations are depicted as 1132 in FIG. 12. As previously noted, if the threshold value has been met, this indicates that thread formation has been completed, or is nearing completion. If the threshold value has been met, the tool controller initiates an end-of-thread alert, in operation 1135. This signals or otherwise informs the user of an end-of-thread condition. Typically, the user will then visibly monitor or otherwise direct attention to the position of the threading die(s) on the workpiece. This is depicted as operation 1140 in FIG. 12. Upon completion of thread formation, the user releases the tool trigger or otherwise de-actuates the tool, as shown by operation 1145 in FIG. 12.

Figure 11:
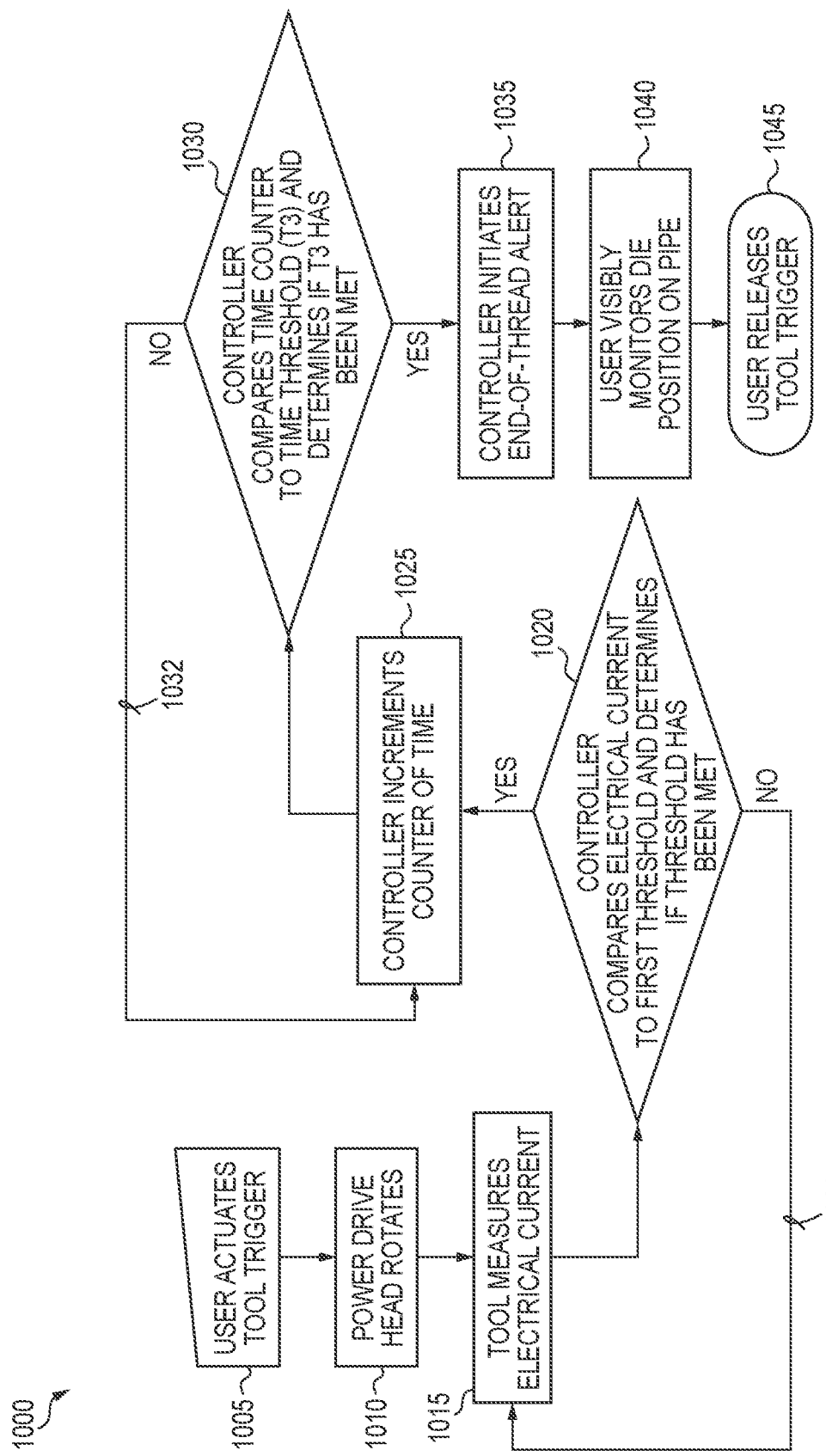
FIG. 11 is a schematic flowchart of another embodiment of a threading operation in accordance with the present subject matter.

Furthermore, the methods could use time rather than motor rotations for the second threshold value. For example, FIG. 11 illustrates a method using electrical current verification and a time based threshold. Specifically, FIG. 11 illustrates a method 1000 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool also includes a sensor for measuring electrical power consumed by the motor, such as sensor 40 in FIG. 1. The tool also includes a controller such as controller 60 shown in FIG. 1. The tool optionally includes a counter of motor rotations such as counter 50 in FIG. 1. The tool also includes memory provisions such as memory 70 in FIG. 1. And the tool also includes an alert for alerting a user such as alert or signal 75 in FIG. 1. The method 1000 comprises various operations as follows. In operation 1005, a user initiates tool activation such as by actuating a tool trigger. As a result of tool actuation, the tool which for example is a power drive, imparts rotation to a tool head which can for example include threading die(s). This is shown in operation 1010. In operation 1015, the tool measures electrical power consumed, i.e., electrical current. Such measurement can be performed by sensor 40. A tool controller then compares the electrical current measured to a first threshold value and determines if the threshold has been met, in operation 1020. If the first threshold value has not been met, tool operation continues and another measurement of electrical current is made which is then compared to the first threshold value, i.e., operations 1015 and 1020. These repeated operations are depicted as operational path 1022 in FIG. 11. As previously noted, if the first threshold value has been met, this indicates that thread formation has begun. If the first threshold value has been met, the tool controller increments a counter of time in operation 1025. This produces a time counter value. Typically, the time counter is configured in the tool controller such as controller 60. In operation 1030, the controller performs a second comparison of the time counter value count from the counter of time to time threshold (T3) and determines if the time threshold has been met. If the time threshold value has not been met, tool operation continues and another operation of the controller incrementing the time counter and comparison to the time threshold is performed, i.e., operations 1025 and 1030. These repeated operations are depicted as 1032 in FIG. 11. As previously noted, if the time threshold value has been met, this indicates that thread formation has been completed, or is nearing completion. If the time threshold value has been met, the tool controller initiates an end-of-thread alert, in operation 1035. This signals or otherwise informs the user of an end-of-thread condition. Typically, the user will then visibly monitor or otherwise direct attention to the position of the threading die(s) on the workpiece. This is depicted as operation 1040 in FIG. 11. Upon completion of thread formation, the user releases the tool trigger or otherwise de-actuates the tool, as shown by operation 1045 in FIG. 11.

Figure 13:
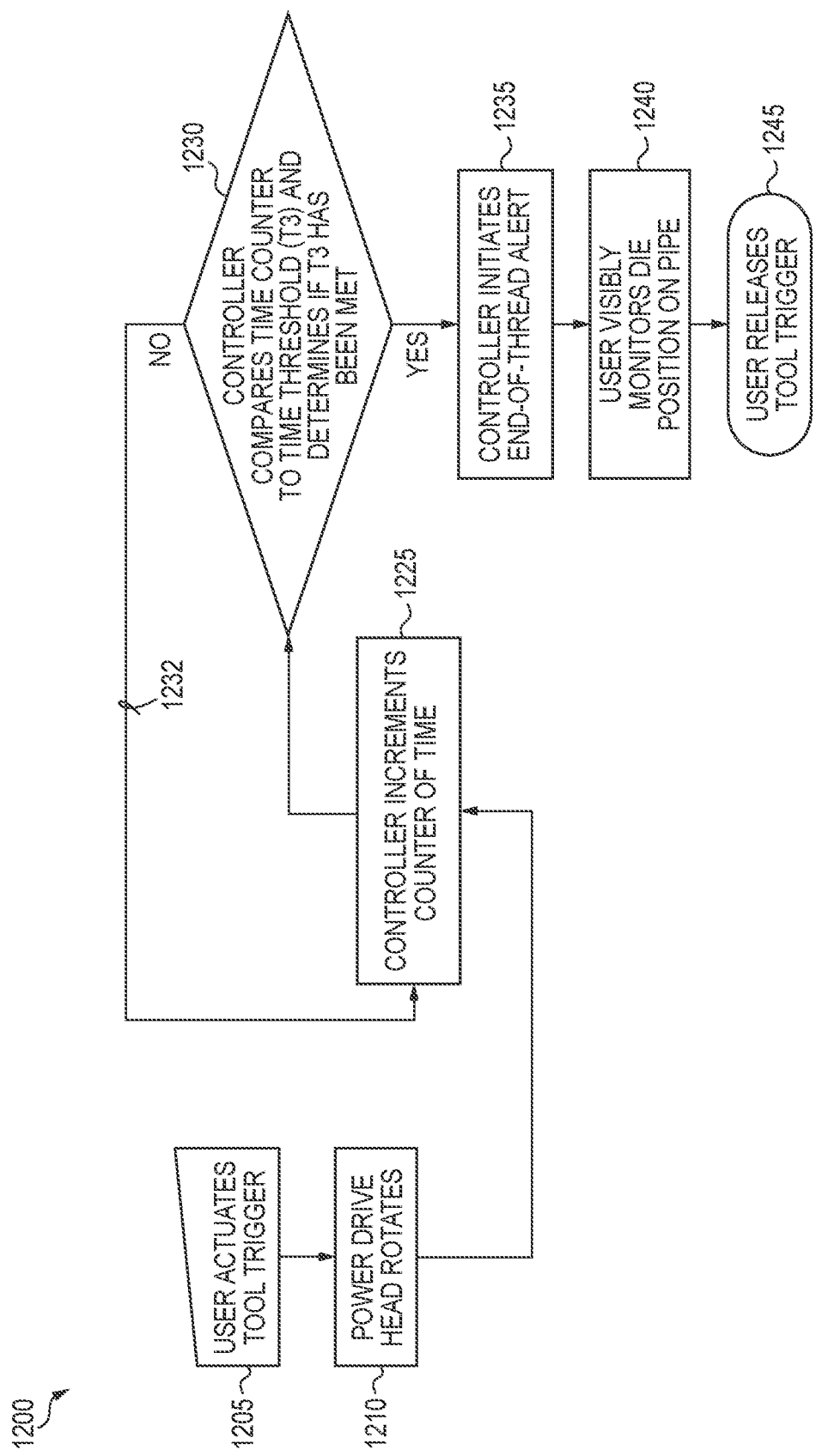
FIG. 13 is a schematic flowchart of another embodiment of a threading operation in accordance with the present subject matter.

It will be understood that the present subject matter includes a wide array of modified methods for performing powered threading operations. For example, FIG. 13 illustrates a method which does not utilize electrical current verification, and which uses a time based threshold. Specifically, FIG. 13 illustrates a method 1200 for forming threads in a workpiece in accordance with the present subject matter. The method is generally performed using a tool 10 that includes a tool head such as tool head 85 in FIG. 1, which includes at least one threading die such as die 90 in FIG. 1. The tool also includes an electric motor such as motor 30 rotatably powering the tool head. The tool may also include a sensor for measuring electrical power consumed by the motor, such as sensor 40 in FIG. 1. The tool also includes a controller such as controller 60 shown in FIG. 1. The tool optionally includes a counter of motor rotations such as counter 50 in FIG. 1. The tool also includes memory provisions such as memory 70 in FIG. 1. And the tool also includes an alert for alerting a user such as alert or signal 75 in FIG. 1. The method 1200 comprises various operations as follows. In operation 1205, a user initiates tool activation such as by actuating a tool trigger. As a result of tool actuation, the tool which for example is a power drive, imparts rotation to a tool head which can for example include threading die(s). This is shown in operation 1210. The tool controller increments a counter of time in operation 1225. This produces a time counter value. Typically, the time counter is configured in the tool controller such as controller 60. In operation 1230, the controller performs a comparison of the time counter value from the counter of time to a threshold value (T3) and determines if the threshold has been met. If the threshold value has not been met, tool operation continues and another operation of the controller incrementing the time counter and comparison to the threshold is performed, i.e., operations 1225 and 1230. These repeated operations are depicted as 1232 in FIG. 13. As previously noted, if the threshold value has been met, this indicates that thread formation has been completed, or is nearing completion. If the threshold value has been met, the tool controller initiates an end-of-thread alert, in operation 1235. This signals or otherwise informs the user of an end-of-thread condition. Typically, the user will then visibly monitor or otherwise direct attention to the position of the threading die(s) on the workpiece. This is depicted as operation 1240 in FIG. 13. Upon completion of thread formation, the user releases the tool trigger or otherwise de-actuates the tool, as shown by operation 1245 in FIG. 13.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method for forming threads in a workpiece using a tool including a tool head having at least one threading die, an electric motor rotatably powering the tool head, a sensor for measuring electrical current consumed by the motor, a controller for controlling operation of the motor, a counter of motor rotations, and memory provisions for saving motor-rotation counts, wherein the method comprises:
   rotating the tool head that includes at least one threading die, by use of the motor;
   measuring electrical current consumed by the motor, by use of the sensor;
   comparing the measured electrical current to a first threshold value, whereby if the first threshold value has not been met, the measuring and comparing operations are repeated;
   if the first threshold value has been met, incrementing the counter of motor rotations to produce a cumulative motor rotation count; and
   performing a second comparison of the cumulative motor rotation count to a second threshold value, whereby if the second threshold value has not been met, the incrementing and second comparing operations are repeated.

2. The method of claim 1 further including:
   if the second threshold value has been met, discontinuing tool operation.

3. The method of claim 1 wherein the tool includes an alert operatively connected to the controller for alerting a user, and wherein the method includes, if the second threshold value has been met, initiating the alert to inform the user of an end-of-thread condition.

4. The method of claim 1 wherein the workpiece is a length of pipe.

5. The method of claim 1 wherein the tool is a hand-held power drive tool.

6. The method of claim 1 wherein the method further comprises:
   if the second threshold value has been met, reversing a direction of rotation of the tool head.

7. The method of claim 1 wherein the method further comprises:
   if a no-load current value has been met, discontinuing tool operation or braking tool rotation.

8. The method of claim 1 wherein the counter of motor rotations counts motor rotations during a thread forming operation.

9. The method of claim 1 wherein the motor rotations occur during a thread forming operation.

* * * * *